United States Patent
Park et al.

(10) Patent No.: US 12,500,452 B2
(45) Date of Patent: Dec. 16, 2025

(54) ELECTRONIC DEVICE WIRELESSLY RECEIVING POWER, AND OPERATING METHOD THEREFOR

(71) Applicant: SAMSUNG ELECTRONICS CO., LTD., Suwon-si (KR)

(72) Inventors: Jaeseok Park, Suwon-si (KR); Beomwoo Gu, Suwon-si (KR); Jaehyun Park, Suwon-si (KR); Sungku Yeo, Suwon-si (KR); Youngho Ryu, Suwon-si (KR); Jeongman Lee, Suwon-si (KR); Chongmin Lee, Suwon-si (KR); Hyoseok Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 38 days.

(21) Appl. No.: 18/093,088

(22) Filed: Jan. 4, 2023

(65) Prior Publication Data

US 2023/0146055 A1    May 11, 2023

Related U.S. Application Data

(63) Continuation of application No. PCT/KR2021/006970, filed on Jun. 3, 2021.

(30) Foreign Application Priority Data

Jul. 7, 2020 (KR) .................. 10-2020-0083218
Aug. 31, 2020 (KR) .................. 10-2020-0110043

(51) Int. Cl.
*H02J 50/12* (2016.01)
*G01R 19/165* (2006.01)
(Continued)

(52) U.S. Cl.
CPC ........ *H02J 50/12* (2016.02); *G01R 19/16576* (2013.01); *H02J 7/00308* (2020.01);
(Continued)

(58) Field of Classification Search
None
See application file for complete search history.

(56) References Cited

U.S. PATENT DOCUMENTS

2013/0099734 A1* 4/2013 Lee .................. H02J 50/80
                                                320/108
2014/0028107 A1  1/2014 Kwon et al.
(Continued)

FOREIGN PATENT DOCUMENTS

JP    2001-238372 A    8/2001
JP    2012-244635      12/2012
(Continued)

OTHER PUBLICATIONS

International Search Report and Written Opinion for PCT/KR2021/006970 mailed Sep. 7, 2021, 9 pages.
(Continued)

*Primary Examiner* — Daniel Kessie
(74) *Attorney, Agent, or Firm* — NIXON & VANDERHYE P.C.

(57) ABSTRACT

An electronic device may include: a battery, a resonant circuit including a receiving coil, at least one capacitor and at least one switch, a rectifier circuit; a DC/DC converter, a charge control circuit; and a controller, wherein the controller may be configured to check the voltage outputted from the rectifier circuit, control the at least one switch so that the receiving coil and the at least one capacitor form a serial resonant circuit, if the voltage output from the rectifier circuit is greater than or equal to a threshold voltage, and control the at least one switch so that the receiving coil and
(Continued)

the at least one capacitor form a parallel resonant circuit, if the voltage output from the rectifier circuit is less than the threshold voltage.

14 Claims, 11 Drawing Sheets

(51) Int. Cl.
  *H02J 7/00* (2006.01)
  *H02J 50/80* (2016.01)
  *H02J 50/90* (2016.01)
(52) U.S. Cl.
  CPC .......... *H02J 7/00712* (2020.01); *H02J 50/80* (2016.02); *H02J 50/90* (2016.02); *H02J 2207/20* (2020.01)

(56) References Cited

U.S. PATENT DOCUMENTS

| | | | |
|---|---|---|---|
| 2014/0265614 A1 | 9/2014 | Kim et al. | |
| 2016/0036265 A1 | 2/2016 | Kim et al. | |
| 2016/0087688 A1* | 3/2016 | Fukaya | H02J 7/00034 307/104 |
| 2016/0254679 A1* | 9/2016 | Liu | H02J 7/00308 307/104 |
| 2016/0336811 A1 | 11/2016 | Liu et al. | |
| 2017/0191743 A1 | 7/2017 | Lee et al. | |
| 2018/0309315 A1* | 10/2018 | Der | H02J 7/00714 |
| 2019/0157910 A1 | 5/2019 | Choi et al. | |
| 2019/0334379 A1 | 10/2019 | Lee et al. | |

FOREIGN PATENT DOCUMENTS

| | | |
|---|---|---|
| JP | 2017-169410 | 9/2017 |
| JP | 2017-225232 | 12/2017 |
| KR | 10-2013-0005571 A | 1/2013 |
| KR | 10-2013-0087708 | 8/2013 |
| KR | 10-2016-0103391 | 9/2016 |
| KR | 10-2017-0072704 | 6/2017 |
| KR | 10-2018-0009175 | 1/2018 |
| KR | 10-2018-0069360 | 6/2018 |
| KR | 10-1944833 | 2/2019 |

OTHER PUBLICATIONS

Korean Decision on Grant dated Mar. 24, 2025 for KR Application No. 10-2020-0110043.
Korean Office Action dated Sep. 6, 2024 for KR Application No. 10-2020-0110043.

* cited by examiner

ELECTRONIC DEVICE WIRELESSLY RECEIVING POWER, AND OPERATING METHOD THEREFOR

CROSS-REFERENCE TO RELATED APPLICATIONS

This application is a continuation of International Application No. PCT/KR2021/006970 filed on 3 Jun. 2021, designating the United States, in the Korean Intellectual Property Receiving Office, and claiming priority to Korean Patent Application No. KR 10-2020-0083218, filed on Jul. 7, 2020, and to KR 10-2020-0110043, filed on Aug. 31, 2020, in the Korean Intellectual Property Office, the disclosures of which are all hereby incorporated by reference herein in their entireties.

BACKGROUND

Field

Certain example embodiments relate to electronic devices wirelessly receiving power and/or methods for operating the same.

Description of Related Art

Portable digital communication devices have become a must-have item for everyone in modern era. Customers desire to receive various high-quality services anytime, anywhere. Internet of Thing (IoT) technology recently bundles various sensors, home appliances, and communication devices up into a single network. A diversity of sensors require a wireless power transmission system for seamless operations. Small Bluetooth headsets, wearing devices, smartphones, or robots, vacuums, or other large-scale electronic devices may be implemented to wirelessly receive power.

Wireless power transmission may be performed in a magnetic induction, magnetic resonance, and electromagnetic wave scheme. The magnetic induction or magnetic resonance scheme is advantageous in charging electronic devices positioned within a relatively short distance from the wireless power transmitter. The electromagnetic wave scheme is more advantageous for remote power transmission that reaches a few meters as compared with the magnetic induction or magnetic resonance scheme. Such electromagnetic wave scheme is primarily intended for remote power transmission and may exactly grasp the location of remote power receivers and deliver power in a most efficient way.

SUMMARY

As the distance between the electronic device and the wireless power transmitter decreases, high power may be wirelessly received from the wireless power transmitter. When the electronic device receives power from the wireless power transmitter by the magnetic resonance scheme, the power transferred to the load of the electronic device may vary depending on the configuration of the resonance circuit. For example, in a case where the electronic device includes a resonance circuit having a reception coil and a capacitor connected in series, when the distance between the electronic device and the wireless power transmitter is short (e.g., when receiving larger power from the wireless power transmitter), the power received from the wireless power transmitter may be transferred to the load of the electronic device at relatively high efficiency, as compared with when the electronic device includes a resonance circuit having a reception coil and a capacitor connected in parallel. In a case where the electronic device includes a resonance circuit having a reception coil and a capacitor connected in parallel, when the distance between the electronic device and the wireless power transmitter is far, the power received from the wireless power transmitter may be transferred to the load of the electronic device at relatively high efficiency, as compared with when the electronic device includes a resonance circuit having a reception coil and a capacitor connected in series.

Accordingly, to transfer the power received from the wireless power transmitter at high efficiency, the electronic device needs to connect the reception coil and the capacitor, included in the resonance circuit, in series or parallel based on the distance between the electronic device and the wireless power transmitter (or the magnitude of the power received from the wireless power transmitter).

According to various example embodiments, there may be provided an electronic device and its operation method for wirelessly receiving power, which may set different connection settings for the resonance circuit based on the distance between the electronic device and the wireless power transmitter.

According to various example embodiments, an electronic device may comprise a battery, a resonance circuit configured to wirelessly receive power and including a reception coil, at least one capacitor, and at least one switch, a rectification circuit configured to rectify AC power provided from the resonance circuit to DC power, a DC/DC converter configured to convert the DC power provided from the rectification circuit and output the converted DC power, and a charge control circuit configured to charge the battery with the converted power provided from the DC/DC converter, and a controller. The controller may be configured to identify a voltage output from the rectification circuit, if the voltage output from the rectification circuit is a threshold voltage or more, control the at least one switch to allow the reception coil and the at least one capacitor to configure a series resonance circuit, and if the voltage output from the rectification circuit is less than the threshold voltage, control the at least one switch to allow the reception coil and the at least one capacitor to configure a parallel resonance circuit.

According to various example embodiments, a method for wirelessly receiving power by an electronic device may comprise identifying a voltage output from a rectification circuit of the electronic device, if the voltage output from the rectification circuit is a threshold voltage or more, controlling at least one switch included in a resonance circuit of the electronic device to allow a reception coil and at least one capacitor included in the resonance circuit to configure a series resonance circuit, and if the voltage output from the rectification circuit is less than the threshold voltage, controlling the at least one switch to allow the reception coil and the at least one capacitor to configure a parallel resonance circuit.

According to various example embodiments, an electronic device may comprise a battery, a resonance circuit including a 1-1th capacitor and a 1-2th capacitor, a 1-1th switch and a 1-2th switch respectively connected in parallel with the 1-1th capacitor and the 1-2th capacitor, a 2-1th capacitor and a 2-2th capacitor, and a 2-1th switch and a 2-2th switch respectively connected in series with the 2-1th capacitor and the 2-2th capacitor, a rectification circuit rectifying AC power provided from the resonance circuit to DC power, a DC/DC converter converting the DC power provided from the rectification circuit and outputting the converted DC power, and a charge control circuit configured to charge the battery with the converted power provided from the DC/DC converter, and a controller. The controller may be configured to identify a voltage output from the rectification circuit, compare the voltage output from the rectification circuit with a first threshold voltage and a second threshold voltage, if the voltage output from the rectification circuit is the first threshold voltage or more, control the 1-1th switch, the 1-2th switch, the 2-1th switch, and the 2-2th switch to allow the resonance circuit to have a first connection setting in which the reception coil and the 1-1th capacitor are connected in series, if the voltage output from the rectification circuit is less than the second threshold voltage, control the 1-1th switch, the 1-2th switch, the 2-1th switch, and the 2-2th switch to allow the resonance circuit to have a second connection setting in which the reception coil and the 2-1th capacitor are connected in parallel, and if the voltage output from the rectification circuit is the second threshold voltage or more and less than the first threshold voltage, control the 1-1th switch, the 1-2th switch, the 2-1th switch, and the 2-2th switch to allow the resonance circuit to have a third connection setting in which the 1-1th capacitor and the 1-2th capacitor are connected in series with the reception coil, and the 2-1th capacitor and the 2-2th capacitor are connected in parallel with the reception coil.

According to various example embodiments, there may be provided an electronic device and its operation method for wirelessly receiving power, which may set different connection settings for the resonance circuit based on the distance between the electronic device and the wireless power transmitter. Thus, the electronic device may transfer the power received from the wireless power transmitter to the load at high efficiency.

Further, the electronic device may enhance power transfer efficiency by changing the connection settings of the resonance circuit based on the distance between the electronic device and the wireless power transmitter, thereby minimizing or reducing heat generation.

Further, the electronic device may determine the distance between the electronic device and the wireless power transmitter based on the output voltage of a rectification circuit of the electronic device even without communication with the wireless power transmitter.

Further, the electronic device may transfer the power received from the wireless power transmitter to the load at high efficiency regardless of whether the wireless power transmitter transmits power to an electronic device other than the electronic device.

Further, when the distance between the electronic device and the wireless power transmitter is short, the electronic device may prevent, or reduce the likelihood of, overvoltage from occurring in the electronic device at least by changing the connection settings of the resonance circuit to correspond to the distance between the electronic device and the wireless power transmitter.

BRIEF DESCRIPTION OF DRAWINGS

The above and other aspects, features, and advantages of certain example embodiments will be more apparent from the following detailed description, taken in conjunction with the accompanying drawings, in which.

DETAILED DESCRIPTION

Hereinafter, certain example embodiments are described in detail with reference to the accompanying drawings. It should be noted that the same element denotations are used to refer to the same elements throughout the specification.

Figure 1:
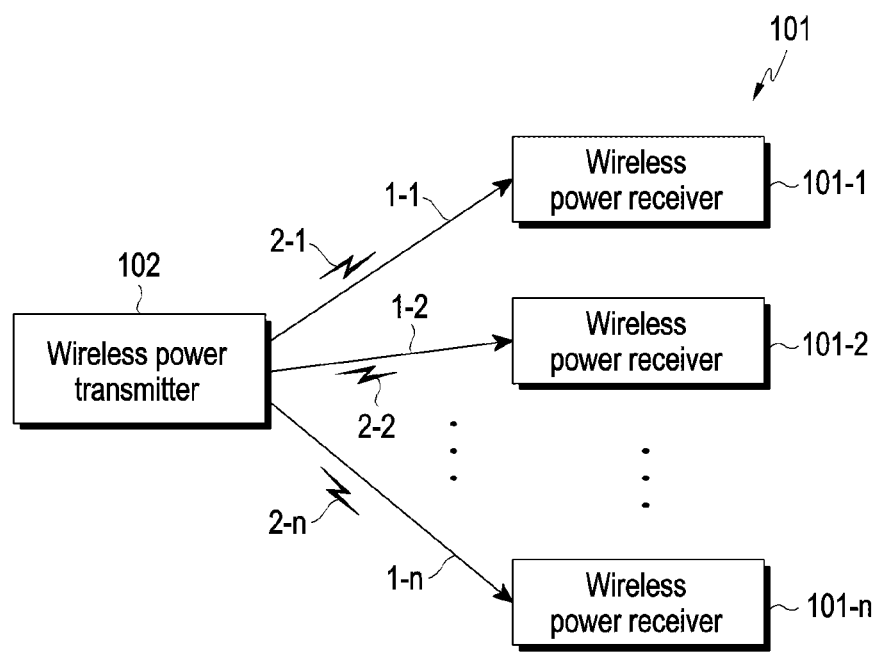
FIG. 1 is a concept view illustrating the overall operation of a wireless charging system according to various example embodiments.

FIG. 1 is a concept view illustrating the overall operation of a wireless charging system according to various embodiments.

Referring to FIG. 1, a wireless charging system may include a wireless power transmitter 102 (e.g., power transmitting unit (PTU)) and at least one wireless power receiver 101 (e.g., at least one power receiver 101-1, 101-2, and 101-n) (e.g., power receiving unit (PRU)).

The wireless power transmitter 102 may wirelessly send power 1-1, 1-2, and 1-n to the at least one wireless power receiver 101-1, 101-2, and 101-n, respectively. For example, the wireless power transmitter 102 may wirelessly transmit the power 1-1, 1-2, and 1-n to a wireless power receiver authenticated by a predetermined authentication process.

The wireless power transmitter 102 may form electrical connections with the wireless power receivers 101-1, 101-2, and 101-n. For example, the wireless power transmitter 102 may electromagnetic fields or waves of wireless power to the wireless power receivers 101-1, 101-2, and 101-n.

The wireless power transmitter 102 may perform bi-lateral communication with the wireless power receivers 101-1, 101-2, and 101-n. Here, the wireless power transmitter 102 and the wireless power receiver 101-1, 101-2, and 101-n may process or communicate packets 2-1, 202, and 2-n including predetermined frames. In an embodiment, the wireless power receivers 101-1, 101-2, and 101-n may be implemented as mobile communication terminals, PDAs, PMPs, smart phones, wearable devices, and the like.

The wireless power transmitter 102 may wirelessly provide power to a plurality of wireless power receivers 101-1, 101-2, and 101-$n$. For example, the wireless power transmitter 102 may transmit power to the plurality of wireless power receivers 101-1, 101-2, and 101-$n$ through the resonant scheme. When the wireless power transmitter 102 adopts the resonant scheme, the distances between the wireless power transmitter 102 and the plurality of wireless power receivers 101-1, 101-2, and 101-$n$ may be, e.g., 30 m or less, but are not limited thereto. When the wireless power transmitter 102 adopts the electromagnetic induction scheme, the distances between the wireless power transmitter 102 and the plurality of wireless power receivers 101-1, 101-2, and 101-$n$ may be, e.g., 10 cm or less, but are not limited thereto.

The wireless power receivers 101-1, 101-2, and 101-$n$ may receive the wireless power from the wireless power transmitter 102 to charge their respective batteries provided therein. Further, the wireless power receivers 101-1, 101-2, and 101-$n$ may transmit, to the wireless power transmitter 102, a signal for requesting to transmit wireless power, information necessary to receive wireless power, state information about the wireless power receivers (e.g., information regarding the movement of the wireless power receivers) or control information about the wireless power transmitter 102.

The wireless power receivers 101-1, 101-2, and 101-$n$ may transmit to the wireless power transmitter 102 messages that indicate the respective states of the wireless power receivers 101-1, 101-2, and 101-$n$.

Each of the wireless power transmitter 102 or the wireless power receivers 101-1, 101-2, and 101-$n$ may include a display means, such as a display. For example, the wireless power transmitter 102 may display the state of each of the wireless power receivers 101-1, 101-2, and 101-$n$ based on the message received from each of the wireless power receivers 101-1, 101-2, and 101-$n$. Further, the wireless power transmitter 102 may also display the time predicted to be taken until each of the wireless power receivers 101-1, 101-2, and 101-$n$ is completely charged.

The wireless power transmitter 102 may transmit a control signal to enable or disable the wireless charging function to each of the wireless power receivers 101-1, 101-2, and 101-$n$. For example, when receiving the control signal to disable the wireless charging function from the wireless power transmitter 102, the wireless power receiver 101 may disable the wireless charging function.

Figure 2:
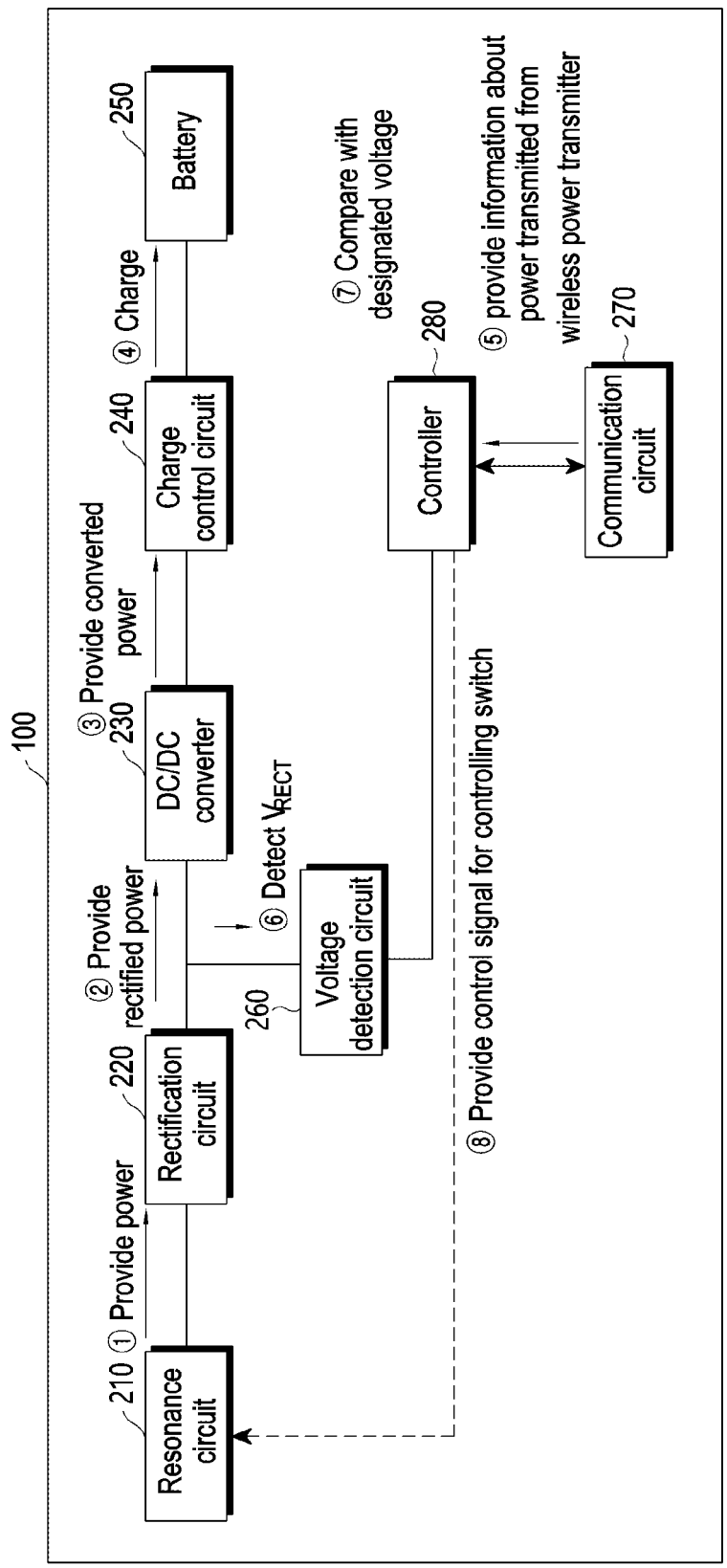
FIG. 2 is a block diagram illustrating an electronic device according to various example embodiments.

FIG. 2 is a block diagram illustrating an electronic device 100 according to various embodiments.

Figure 3:
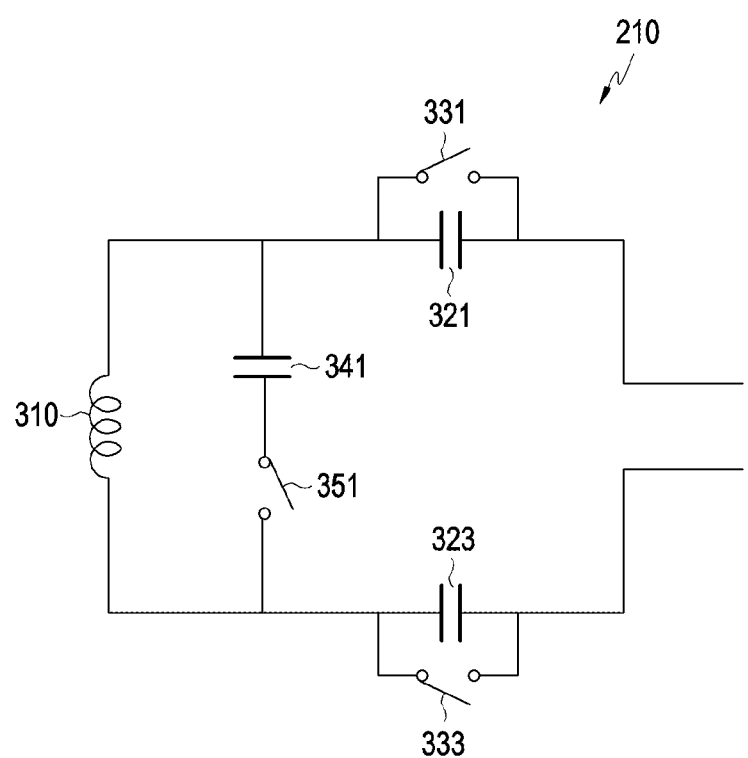
FIG. 3 is a view illustrating a resonance circuit according to various example embodiments.

FIG. 3 is a view illustrating a resonance circuit 210 according to various embodiments.

Referring to FIGS. 2 and 3, in an embodiment, an electronic device 100 (e.g., at least one wireless power receiver 101) may include a resonance circuit 210, a rectification circuit 220, a DC/DC converter 230, a charge control circuit 240 (e.g., power management integrated circuit (PMIC)), a battery 250, a voltage detection circuit 260, a communication circuit 270, and a controller 280. In an embodiment, the electronic device 100 may be one of the wireless power receivers 101-1, 101-2, and 101-$n$ of FIG. 1.

In an embodiment, an induced electromotive force may be generated in the resonance circuit 210 of the electronic device 100 based on a time-varying magnetic field output or formed by the wireless power transmitter 102. This process may be expressed as receiving wireless power or wirelessly receiving power from the electronic device 100. The power received through the resonance circuit 210 of the electronic device 100 may be AC power and may be transferred to the rectification circuit 220.

In an embodiment, the resonance circuit 210 may include a reception coil 310, first capacitors 321 and 323 connected, directly or indirectly, in series with the reception coil 310, first switches 331 and 333 connected in parallel with the first capacitors 321 and 323, a second capacitor 341 connected in parallel the reception coil 310, and a second switch 351 connected, directly or indirectly, in series with the second capacitor 341.

In an embodiment, when the first switches 331 and 333 connected in parallel with the first capacitors 321 and 323 are turned on (e.g., when the first switches 331 and 333 are short-circuited), no current flows through the first capacitors 321 and 323 from the induced electromotive force formed in the reception coil 310 (e.g., the first capacitors 321 and 323 may not be electrically connected to the reception coil 310), and current may flow through the first switches 331 and 333. In an embodiment, when the first switches 331 and 333 connected in parallel with the first capacitors 321 and 323 are turned off (e.g., when the first switches 331 and 333 are opened), current may flow through the first capacitors 321 and 323 from the induced electromotive force formed in the reception coil 310 and no current may flow through the first switches 331 and 333.

In an embodiment, the first capacitors 321 and 323 may include a plurality of capacitors having the same capacitance. For example, when the rectification circuit 220 connected, directly or indirectly, to the resonance circuit 210 includes a full-bridge circuit, the first capacitors 321 and 323 may include a capacitor 321 and a capacitor 323 having the same capacitance, respectively connected to the two input terminals of the rectification circuit 220 for the rectification circuit 220 to convert the input AC power into DC power and output the DC power. However, without limitations thereto, when the rectification circuit 220 connected to the resonance circuit 210 includes a half-bridge circuit, the first capacitors 321 and 323 may include only one capacitor connected, directly or indirectly, with the rectification circuit 220. When the first capacitors 321 and 323 are implemented as one capacitor, the capacitance C1 of the capacitor may be identical to the equivalent capacitance of the capacitance C2 of the capacitor 321 and the capacitance C3 of the capacitor 323. Specifically, it may be determined as 1/C1=1/C2+1/C3. When C2 and C3 are the same, it may be determined as C1=C2/2.

In an embodiment, when the first capacitors 321 and 323 include a plurality of capacitors, the first switches 331 and 333 may include a plurality of switches (e.g., the switch 331 and the switch 333) respectively connected in parallel with the plurality of capacitors.

In an embodiment, when the second switch 351 connected in series with the second capacitor 341 is turned on, the reception coil 310 is electrically connected to the second capacitor 341 so that current may flow to the second capacitor 341 by the induced electromotive force formed in the reception coil 310. In an embodiment, when the second switch 351 connected in series with the second capacitor 341 is turned off, no current flows through the second capacitor 341 so that the second capacitor 341 may not be electrically connected with the reception coil 310.

In an embodiment, the capacitances of the first capacitors 321 and 323 (e.g., the equivalent capacitance of the capacitor 321 and the capacitor 323) may be identical to the capacitance of the second capacitor 341.

The first switch and the second switch may be operated based on the control signal received from the controller 280. For example, the first switches 331 and 333 and the second switch 351 may perform a switching operation to make a connection setting in which the reception coil 310 and the first capacitors 321 and 323 in the resonance circuit 210 are electrically connected in series, and the reception coil 310 and the second capacitor 341 are not electrically connected based on the first control signal received from the controller 280 (hereinafter, denoted as a 'first connection setting').

Further, the first switches 331 and 333 and the second switch 351 may perform a switching operation to make a connection setting in which the reception coil 310 and the second capacitor 341 in the resonance circuit 210 are electrically connected in parallel, and the reception coil 310 and the first capacitors 321 and 323 are not electrically connected (e.g., the first switches 331 and 333 are short-circuited) based on the second control signal received from the controller 280 (hereinafter, denoted as a 'second connection setting'). The first capacitors 321 and 323 and the second capacitor 341 may have the same capacitance so that the resonance circuit 210 forms resonance at the same frequency in the first connection setting and the second connection setting. In an embodiment, the inductance of the reception coil 310 may be 1.2 pH (henry), the first capacitor 321 and the first capacitor 323 each may be 940 pF (farad), and the second capacitor 341 may be 470 pF. In this case, the resonant frequency in the first connection setting of the resonance circuit 210 and the resonant frequency in the second connection setting of the resonance circuit 210 may be the same as 6.7 MHz.

In an embodiment, the impedance of the first connection setting of the resonance circuit 210 may be smaller than the impedance of the second connection setting of the resonance circuit 210. For example, the impedance of the first connection setting of the resonance circuit 210 may be smaller than the impedance of the second connection setting in a designated frequency range (e.g., a frequency range between half-power frequencies (frequencies when ½ of the power in the resonance state is received)). The impedance of the first connection setting and the impedance of the second connection setting of the resonance circuit 210 may be impedances measured at the input terminal of the rectification circuit 220 (e.g., viewed from the input terminal of the rectification circuit 220 to the resonance circuit 210).

In an embodiment, the first connection setting of the resonance circuit 210 may be a connection setting in which the power received from the wireless power transmitter 102 may be transferred to a load (e.g., the battery 250) with high efficiency as compared with the second connection setting of the resonance circuit 210 when the power received from the wireless power transmitter 102 is a designated power or more (or when included in a power range of the designated power or more). For example, as the power received from the wireless power transmitter 102 increases, higher current may flow to the load. When a constant voltage (e.g., about 4.2V (volt)) is applied to both terminals of the battery 250 by the charge control circuit 240, as the current to the load increases, the impedance of the load may reduce. A relationship between the reception power of the electronic device 100 and the load impedance is described below in detail with reference to FIG. 4.

Figure 4:
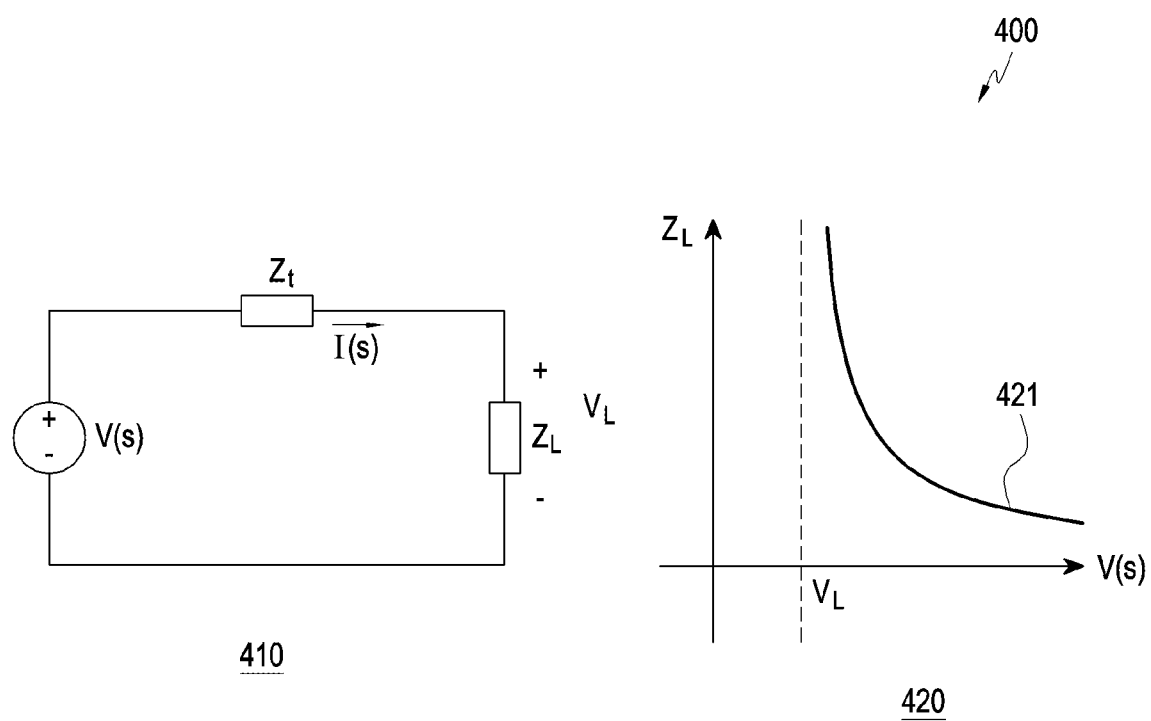
FIG. 4 is a view illustrating a relationship between received power and impedance of a load according to various example embodiments.

FIG. 4 is a view illustrating a relationship between received power and impedance of a load according to various embodiments.

Referring to FIG. 4, in an embodiment, in the circuit 410, V(s) (where s=w*j) may denote the voltage of the power received from the wireless power transmitter 102 by the reception coil 310 of the electronic device 100 (e.g., voltage induced in the reception coil 310 by the magnetic field radiated from the wireless power transmitter 102), and I(s) may denote the current flowing to the load (e.g., the battery 250). Zt may denote the impedance viewed from the load, and $Z_L$ may denote the impedance of the load. $V_L$ may denote the voltage of the load. In an embodiment, $V_L$ is the output voltage of the charge control circuit 240 for charging the load, and may be a voltage having a constant (or fixed) magnitude (e.g., 4.2V) regardless of V(s). In an embodiment, as the power received by the reception coil 310 of the electronic device 100 from the wireless power transmitter 102 increases, the magnitude of V(s) may also increase. For example, as the power received by the reception coil 310 of the electronic device 100 from the wireless power transmitter 102 increases, the magnitude of V(s) as a voltage induced in the reception coil 301 may increase.

In an embodiment, the circuit 410 may be represented as Equation 1 and Equation 2 below.

$$V(s)=I(s)*(Z_t+Z_L) \quad [\text{Equation 1}]$$

$$V_L=Z_L/I(s) \quad [\text{Equation 2}]$$

Based on Equation 1 and Equation 2, Equation 3 below may be obtained.

$$Z_L = \frac{V_L^* Z_t}{V(s) - V_L} \quad [\text{Equation 3}]$$

In an embodiment, the graph 420 may represent the relationship 400 between V(s) and $Z_L$ according to Equation 3. In an embodiment, since the electronic device 100 may normally receive power from the wireless power transmitter 102 only when V(s) is higher than $V_L$, the graph 420 may represent only the line 421 corresponding to when V(s) is higher than $V_L$. In an embodiment, $V_L*Z_t$ in Equation 3 may be a constant value. Accordingly, as in line 421 of graph 420, V(s) and $Z_L$ may have an inverse relationship. For example, when V(s) increases, $Z_L$ may decrease, and when V(s) decreases, $Z_L$ may increase.

In an embodiment, as the power received by the reception coil 310 of the electronic device 100 from the wireless power transmitter 102 increases, the magnitude of V(s) as a voltage induced in the reception coil 301 may increase and, as the magnitude of V(s) increase, $Z_L$ may decrease. Accordingly, as the power received by the reception coil 310 of the electronic device 100 from the wireless power transmitter 102 increases, $Z_L$ as the impedance of the load may decrease.

In an embodiment, since the impedance in the first connection setting of the resonance circuit 210 is smaller than the impedance in the second connection setting of the resonance circuit 210, the difference between the magnitude of the impedance in the first connection setting of the resonance circuit 210 and the reduced magnitude of the load impedance may be smaller than the difference between the magnitude of the impedance in the second connection setting and the reduced magnitude of the load impedance. Since the difference between the magnitude of the impedance in the first connection setting of the resonance circuit 210 and the reduced magnitude of the load impedance is smaller than the difference between the magnitude of the impedance in the second connection setting of the resonance circuit 210 and the reduced magnitude of the load impedance, the first connection setting of the resonance circuit 210 may be a connection setting in which when the power received from the wireless power transmitter 102 is a designated power or more, the power received from the wireless power transmitter 102 may be transferred to the load (e.g., the battery 250) with high efficiency as compared with the second connection setting of the resonance circuit 210. In an embodiment, the first connection setting of the resonance circuit 210 may also be denoted as a 'series connection setting of reception coil and capacitor.'

In an embodiment, the second connection setting of the resonance circuit 210 may be a connection setting in which the power received from the wireless power transmitter 102 may be transferred to a load (e.g., the battery 250) with high efficiency as compared with the first connection setting of the resonance circuit 210 when the power received from the wireless power transmitter 102 is less than the designated power (or when included in a power range less than the designated power). In an embodiment, the second connection setting of the resonance circuit 210 may also be denoted as a 'parallel connection setting of reception coil and capacitor.'

In an embodiment, the first switches 331 and 333 and the second switch 351 may be bidirectional switches capable of performing an on/off operation for AC signals (e.g., AC voltage and AC current). The configuration and operation of the first switches 331 and 333 and the second switch 351 implemented as bidirectional switches are described below in detail with reference to FIG. 10.

In an embodiment, the rectification circuit 220 may rectify the AC current provided from the resonance circuit 210 into a DC current. The rectification circuit 220 may include a bridge circuit (e.g., a full-bridge circuit or a half-bridge circuit). The rectified power may be transferred to the DC/DC converter 230 according to the switching operation of the bridge circuit of the rectification circuit 220. The output voltage $V_{RECT}$ measured at the output terminal of the rectification circuit 220 may be sensed through the voltage detection circuit 260 for control of the controller 280 to be described below.

In an embodiment, the DC/DC converter 230 may convert and/or regulate the voltage of the rectified power transferred from the rectification circuit 220. The DC/DC converter 230 may provide power having a substantially constant voltage. Meanwhile, the DC/DC converter 230 may be connected to at least one piece of hardware (or the charge control circuit 240 (e.g., PMIC) for providing power to the hardware). The at least one piece of hardware (or the charge control circuit 240) may be operate using the power from the DC/DC converter 230. Here, a plurality of DC/DC converters 230 may be implemented.

In an embodiment, the charge control circuit 240 may receive the power output from the DC/DC converter 230 and charge the battery 250 connected to the charge control circuit 240 with the received power. The charge control circuit 240 may control the current and/or voltage applied to the battery 250 based on various charging modes (e.g., a constant current (CC) mode, a constant voltage (CV) mode, or a quick charging mode). For example, the charge control circuit 240 may control the current and/or voltage applied to the battery 250 based on the charge state of the battery 250. Or, the charge control circuit 240 may control the current and/or voltage applied to the battery 250 based on a user input. The type of the battery 250 is not limited as long as it is a rechargeable secondary battery.

In an embodiment, the charge control circuit 240 may convert and/or regulate the current received from the DC/DC converter 230. The charge control circuit 240 may transfer the converted and/or regulated current to the battery 250.

In an embodiment, the voltage detection circuit 260 may detect (or measure) the voltage $V_{RECT}$ of the output terminal of the rectification circuit 220. The voltage detection circuit 260 may provide the voltage $V_{RECT}$ of the output terminal of the rectification circuit 220 to the controller 280. In FIG. 2, the voltage detection circuit 260 is exemplified as a component independent from the controller 280, but is not limited thereto. For example, the voltage detection circuit 260 may be included in the controller 280.

In an embodiment, the communication circuit 270 may enable the electronic device 100 to communicate with the wireless power transmitter 102. In an embodiment, the communication circuit 270 may include an out-band communication circuit (e.g., a Bluetooth low energy (BLE) communication circuit). However, the communication circuit 270 may include an in-band communication circuit in place of or in addition to the out-band communication circuit.

In an embodiment, the controller 280 may perform an operation for charging the battery 250. For example, when power is received from the wireless power transmitter 102 through the resonance circuit 210 (①), the controller 280 may control the rectification circuit 220 to rectify the received AC power into DC power (②). The controller 280 may control the DC/DC converter 230 to convert and output the DC current provided from the rectification circuit 220 (③). The controller 280 may control the charge control circuit 240 to charge the battery 250 with the converted power provided from the DC/DC converter 230 (④).

In an embodiment, the controller 280 may perform an operation (e.g., switching operations of the switches in the resonance circuit 210) to provide the power received from the wireless power transmitter 102 to the load (e.g., the battery 250) with maximum or high efficiency, using information related to the distance between the electronic device 100 (e.g., wireless power receiver) and the wireless power transmitter 102.

In an embodiment, the controller 280 may receive information about the power transmitted from the wireless power transmitter 102 (hereinafter, denoted as 'first power'), through the communication circuit 270 (⑤).

In an embodiment, the first power may be the power output by the power amplifier (not shown) of the wireless power transmitter 102 (or the power input to the power transmission coil). For example, the wireless power transmitter 102 may detect the voltage and current output from the power amplifier (or power transmission coil) of the wireless power transmitter 102. The wireless power transmitter 102 may determine (e.g., calculate) the first power based on the detected voltage and current. The wireless power transmitter 102 may transmit information about the first power to the electronic device 100 (e.g., the communication circuit 270) through the communication circuit of the wireless power transmitter 102. Although the first power has been described above as having the [W] unit, it will be appreciated by one of ordinary skill in the art that the unit of the magnitude of the first power may be replaced with the unit of voltage or current in other various examples.

In an embodiment, the first power may be determined based on the power detected using a directional coupler of the wireless power transmitter 102. For example, it is possible to separately detect the forwarded power output from the power amplifier of the wireless power transmitter 102 and the reflection power provided from the resonance circuit of the wireless power transmitter 102, using the directional coupler of the wireless power transmitter 102. The first power may be the forwarded power output from the power amplifier of the wireless power transmitter 102, minus the reflection power provided from the resonance circuit of the wireless power transmitter 102.

In an embodiment, the controller 280 may identify (e.g., measure) the output voltage $V_{RECT}$ of the rectification circuit 220 detected (⑥) by the voltage detection circuit 260.

In an embodiment, the controller 280 may compare the output power $V_{RECT}$ of the rectification circuit 220 with a threshold voltage (hereinafter referred to as a 'threshold voltage') (⑦). For example, the controller 280 may identify whether the output voltage $V_{RECT}$ of the rectification circuit 220 is the threshold voltage or more.

In an embodiment, the threshold voltage may be a voltage for the controller 280 to determine a connection setting (or a switching operation of a switch) of the resonance circuit 210. For example, when the output voltage $V_{RECT}$ of the rectification circuit 220 is the threshold voltage or more, the controller 280 may control the switch (e.g., the switches 331, 333, and 351) so that the resonance circuit 210 has the first connection setting. As another example, when the output voltage $V_{RECT}$ of the rectification circuit 220 is less than the threshold voltage, the controller 280 may control the switch (e.g., the switches 331, 333, and 351) so that the resonance circuit 210 has the second connection setting.

In an embodiment, the threshold voltage may correspond to the first power (e.g., the magnitude of the first power) transmitted from the wireless power transmitter 102. In a state in which the electronic device 100 is positioned at a predetermined distance from the wireless power transmitter 102, as the wireless power transmitter 102 increases the first power (e.g., as the wireless power transmitter 102 increases the magnitude of the first power), the output voltage $V_{RECT}$ of the rectification circuit 220 may increase. Since the threshold voltage is set for the electronic device 100 to determine (or predict) the distance from the wireless power transmitter 102, as the first power increases, the threshold voltage may be set (or designated) to increase.

In an embodiment, when the memory (not shown) of the electronic device 100 stores information indicating that the wireless power transmitter 102 transmits a predetermined magnitude of first power when the electronic device 100 and the wireless power transmitter 102 are connected, the controller 280 may identify whether the output voltage $V_{RECT}$ of the rectification circuit 220 is not less than the threshold voltage (or less than the threshold voltage) corresponding to the predetermined magnitude of first power stored in the memory of the electronic device 100. For example, even before the electronic device 100 is connected to the wireless power transmitter 102 through the communication circuit 270, the controller 280 may compare the output voltage $V_{RECT}$ of the rectification circuit 220 with the threshold voltage set corresponding to the predetermined magnitude of first power.

In an embodiment, the controller 280 may determine (e.g., calculate) the distance between the electronic device 100 and the wireless power transmitter 102 based on the output voltage $V_{RECT}$ of the rectification circuit 220 and the first power. For example, when the wireless power transmitter 102 transmits the first power having a constant magnitude regardless of the distance between the wireless power transmitter 102 and the electronic device 100, the electronic device 100 may receive higher power from the wireless power transmitter 102 as the distance between the wireless power transmitter 102 and the electronic device 100 reduces.

As the electronic device 100 receives higher power from the wireless power transmitter 102, the output voltage $V_{RECT}$ of the rectification circuit 220 may increase. A table in which the output voltage $V_{RECT}$ of the rectification circuit 220 is set (e.g., mapped) to correspond to the distance between the wireless power transmitter 102 and the electronic device 100 according to the first power (e.g., the magnitude of the first power) (e.g., every designated magnitude interval of the first power) (hereinafter, denoted as a 'first table') may be stored in the memory. The controller 280 may determine the distance between the wireless power transmitter 102 and the electronic device 100 by identifying the output voltage $V_{RECT}$ of the rectification circuit 220 and the first power based on the first table. The controller 280 may determine whether the determined distance between the wireless power transmitter 102 and the electronic device 100 is a designated distance or more to change (or maintain) the connection setting (e.g., the first connection setting or second connection setting) of the resonance circuit 210.

In an embodiment, the controller 280 may identify the current output from the rectification circuit 220 as information related to the distance between the wireless power transmitter 102 and the electronic device 100. For example, although not shown in FIG. 2, the electronic device 100 may further include an over-voltage protection circuit connected between the rectification circuit 220 and the DC/DC converter 230. Upon detecting a voltage $V_{RECT}$ which is the designated voltage or more, in the rectification circuit 220 as the electronic device 100 approaches the wireless power transmitter 102 (e.g., upon identifying that the voltage $V_{RECT}$ output from the rectification circuit 220 is the designated voltage or more), the controller 280 may provide a control signal to the switch included in the over-voltage protection circuit so that the switch included in the over-voltage protection circuit is turned on to perform an over-voltage protection operation to protect the components of the electronic device 100. When the switch included in the over-voltage protection circuit is turned on, the current output from the rectification circuit 220 may flow to the over-voltage protection circuit. In an embodiment, the over-voltage protection circuit may include a transient voltage suppressor (TVS) diode.

The controller 280 may identify the output current of the rectification circuit 220 which flows to the over-voltage protection circuit. The controller 280 may determine whether the output current of the rectification circuit 220 is a threshold current or more (hereinafter, denoted as a 'threshold current').

In an embodiment, the threshold current may correspond to the first power transmitted by the wireless power transmitter 102. In a state in which the electronic device 100 is positioned at a constant distance from the wireless power transmitter 102, as the wireless power transmitter 102 increases the first power, the current flowing to the over-voltage protection circuit at the time of detection of the voltage $V_{RECT}$ of the designated voltage or more in the rectification circuit 220 may increase. Since the threshold current is set for the electronic device 100 to determine (or predict) the distance from the wireless power transmitter 102, as the first power increases, the threshold current may be set (or designated) to increase.

In an embodiment, the controller 280 may calculate the distance between the wireless power transmitter 102 and the electronic device 100 based on the current flowing to the over-voltage protection circuit and the first power. A table in which the current flowing to the over-voltage protection circuit at the time of detection of the voltage $V_{RECT}$ of the designated voltage or more in the rectification circuit 220 is set to correspond to the distance between the wireless power transmitter 102 and the electronic device 100 according to the first power (e.g., the magnitude of the first power) (e.g., every designated magnitude interval of the first power) (hereinafter, denoted as a 'second table') may be stored in the memory. The controller 280 may determine the distance between the wireless power transmitter 102 and the electronic device 100 by identifying the current flowing to the over-voltage protection circuit and the first power based on the second table. The controller 280 may determine whether the determined distance between the wireless power transmitter 102 and the electronic device 100 is a designated distance or more to change (or maintain) the connection setting (e.g., the first connection setting or second connection setting) of the resonance circuit 210.

In an embodiment, the controller 280 may receive information about the voltage standing wave ratio (VSWR) as the information related to the distance between the wireless power transmitter 102 and the electronic device 100 from the wireless power transmitter 102 through the communication circuit 270. In an embodiment, the wireless power transmitter 102 may detect the forwarded power output from the power amplifier of the wireless power transmitter 102 and the reflection power provided from the resonance circuit of the wireless power transmitter 102, using the directional coupler of the wireless power transmitter 102. The wireless power transmitter 102 may determine (e.g., calculate) the voltage standing wave ratio based on the detected forwarded power and reflection power.

In an embodiment, the controller 280 may determine whether the voltage standing wave ratio is equal to or larger than a threshold voltage standing wave ratio (hereinafter referred to as a 'threshold voltage standing wave ratio').

In an embodiment, as the distance between the electronic device 100 and the wireless power transmitter 102 decreases, the voltage standing wave ratio of the wireless power transmitter 102 may increase.

In an embodiment, the controller 280 may determine (e.g., calculate) the distance between the wireless power transmitter 102 and the electronic device 100 based on the voltage standing wave ratio. A table in which the voltage standing wave ratio is set to correspond to the distance between the wireless power transmitter 102 and the electronic device 100 (hereinafter, denoted as a 'third table') may be stored in the memory. The controller 280 may determine the distance between the wireless power transmitter 102 and the electronic device 100 by identifying the voltage standing wave ratio, based on the third table. The controller 280 may determine whether the determined distance between the wireless power transmitter 102 and the electronic device 100 is a designated distance or more to change (or maintain) the connection setting (e.g., the first connection setting or second connection setting) of the resonance circuit 210. In an embodiment, when using the voltage standing wave ratio as the information related to the distance between the wireless power transmitter 102 and the electronic device 100, the controller 280 may not receive the information about the first power transmitted from the wireless power transmitter 102 through the communication circuit 270. For example, since the voltage standing wave ratio of the wireless power transmitter 102 is determined regardless of the first power, the controller 280 may determine whether the voltage standing wave ratio is the threshold voltage standing wave ratio or calculate the distance between the wireless power transmitter 102 and the electronic device 100 based on the voltage standing wave ratio without using the first power. The controller 280 may determine whether the determined distance between the wireless power transmitter 102 and the electronic device 100 is a designated distance or more to change (or maintain) the connection setting (e.g., the first connection setting or second connection setting) of the resonance circuit 210.

In an embodiment, the controller 280 may receive information related to the impedance measured in the resonance circuit of the wireless power transmitter 102 (e.g., information about the phase of the impedance of the resonance circuit of the wireless power transmitter 102) as the information related to the distance between the wireless power transmitter 102 and the electronic device 100, from the wireless power transmitter 102 through the communication circuit 270. In an embodiment, the wireless power transmitter 102 may continuously detect the voltage input to the resonance circuit of the wireless power transmitter 102 (or output from the power amplifier of the wireless power transmitter 102), thereby detecting the waveform of the detected voltage. The wireless power transmitter 102 may continuously detect the current input to the resonance circuit of the wireless power transmitter 102 (or output from the power amplifier of the wireless power transmitter 102), thereby detecting the waveform of the detected current. The wireless power transmitter 102 may identify (e.g., calculate) the respective zero crossing points of the waveform of the voltage and the waveform of the current input to the resonance circuit from the waveform of the voltage and the waveform of the current input to the resonance circuit. The wireless power transmitter 102 may identify the phase of the impedance of the resonance circuit (e.g., the delayed phase of the waveform of the current input to the resonance circuit for the waveform of the voltage input to the resonance circuit) based on the identified zero crossing points. The phase of the impedance of the resonance circuit of the wireless power transmitter 102 may increase with a (−) sign (e.g., the capacitive component of the impedance of the resonance circuit of the wireless power transmitter 102 increases) as the distance between the wireless power transmitter 102 and the electronic device 100 decreases and may increase with a (+) sign (e.g., the inductive component of the impedance of the resonance circuit of the wireless power transmitter 102 increases) as the distance between the wireless power transmitter 102 and the electronic device 100 increases.

In an embodiment, the controller 280 may determine whether the phase of the impedance of the resonance circuit of the wireless power transmitter 102 is a threshold phase or more (hereinafter, a 'threshold phase').

In an embodiment, the controller 280 may calculate the distance between the wireless power transmitter 102 and the electronic device 100 based on the phase of the impedance of the resonance circuit of the wireless power transmitter 102. A table in which the phase of the impedance of the resonance circuit of the wireless power transmitter 102 is set to correspond to the distance between the wireless power transmitter 102 and the electronic device 100 (hereinafter, denoted as a 'fourth table') may be stored in the memory. The controller 280 may determine the distance between the wireless power transmitter 102 and the electronic device 100 by identifying the phase of the impedance of the resonance circuit of the wireless power transmitter 102 based on the fourth table. In an embodiment, when using the phase of the impedance of the resonance circuit of the wireless power transmitter 102 as the information related to the distance between the wireless power transmitter 102 and the electronic device 100, the controller 280 may not receive the information about the first power transmitted from the wireless power transmitter 102 through the communication circuit 270. For example, since the phase of the impedance of the resonance circuit of the wireless power transmitter 102 is determined regardless of the first power, the controller 280 may determine whether the phase of the impedance of the resonance circuit of the wireless power transmitter 102 is the threshold phase or more or calculate the distance between the wireless power transmitter 102 and the electronic device 100 based on the phase of the impedance of the resonance circuit of the wireless power transmitter 102 without using the first power. The controller 280 may determine whether the determined distance between the wireless power transmitter 102 and the electronic device 100 is a designated distance or more to change (or maintain) the connection setting (e.g., the first connection setting or second connection setting) of the resonance circuit 210.

In an embodiment, the controller 280 may provide control signals for controlling the switches included in the resonance circuit 210 to the resonance circuit 210 based on whether the output voltage $V_{RECT}$ of the rectification circuit 220 is the threshold voltage or more. For example, upon identifying that the output voltage $V_{RECT}$ of the rectification circuit 220 is the threshold voltage or more, the controller 280 may provide a control signal for turning off the first switches 331 and 333 and the second switch 351 to the first switches 331 and 333 and the second switch 351 to allow the resonance circuit 210 to have the first connection setting in which the reception coil 310 is electrically connected in series with the first capacitors 321 and 323, and the reception coil 310 is not electrically connected with the second capacitor 341. As another example, upon identifying that the output voltage $V_{RECT}$ of the rectification circuit 220 is less than the threshold voltage, the controller 280 may provide a control signal for turning on the first switches 331 and 333 and the second switch 351 to the first switches 331 and 333 and the second switch 351 to allow the resonance circuit 210 to have the second connection setting in which the reception coil 310 is electrically connected in series with the second capacitor 341, and the reception coil 310 is not electrically connected with the first capacitors 321 and 323.

In an embodiment, the controller 280 may provide control signals for controlling the switches included in the resonance circuit 210 to the resonance circuit 210 based on whether the current output from the rectification circuit 220 is the threshold current or more. For example, upon identifying that the current output from the rectification circuit 220 is the threshold current or more, the controller 280 may provide a control signal for turning off the first switches 331 and 333 and the second switch 351 to the first switches 331 and 333 and the second switch 351 to allow the resonance circuit 210 to have the first connection setting. As another example, upon identifying that the current output from the rectification circuit 220 is less than the threshold current, the controller 280 may provide a control signal for turning on the first switches 331 and 333 and the second switch 351 to the first switches 331 and 333 and the second switch 351 to allow the resonance circuit 210 to have the second connection setting.

In an embodiment, the controller 280 may provide a control signal for controlling the switches included in the resonance circuit 210 to the resonance circuit 210 based on whether the voltage standing wave ratio related to the first power transmitted from the wireless power transmitter 102, received through the communication circuit 270, is the threshold voltage standing wave ratio or more. For example, upon identifying that the voltage standing wave ratio related to the first power is the threshold voltage standing wave ratio or more, the controller 280 may provide a control signal for turning off the first switches 331 and 333 and the second switch 351 to the first switches 331 and 333 and the second switch 351 to allow the resonance circuit 210 to have the first connection setting. As another example, upon identifying that the voltage standing wave ratio related to the first power is less than the threshold voltage standing wave ratio, the controller 280 may provide a control signal for turning on the first switches 331 and 333 and the second switch 351 to the first switches 331 and 333 and the second switch 351 to allow the resonance circuit 210 to have the second connection setting.

In an embodiment, the controller 280 may provide a control signal for controlling the switches included in the resonance circuit 210 to the resonance circuit 210 based on whether the phase of the impedance of the resonance circuit of the wireless power transmitter 102 received through the communication circuit 270 is the threshold phase or more. For example, upon identifying that the phase of the impedance of the resonance circuit of the wireless power transmitter 102 is the threshold phase or more, the controller 280 may provide a control signal for turning on the first switches 331 and 333 and the second switch 351 to the first switches 331 and 333 and the second switch 351 to allow the resonance circuit 210 to have the second connection setting. As another example, upon identifying that the phase of the impedance of the resonance circuit of the wireless power transmitter 102 is less than the threshold phase, the controller 280 may provide a control signal for turning off the first switches 331 and 333 and the second switch 351 to the first switches 331 and 333 and the second switch 351 to allow the resonance circuit 210 to have the first connection setting.

In an embodiment, the controller 280 may control the switch included in the resonance circuit 210 using at least one method among a method for controlling the switch of the resonance circuit 210 based on whether the output voltage $V_{RECT}$ of the rectification circuit 220 is the threshold voltage or more (hereinafter, denoted as a 'first method'), a method for controlling the switch included in the resonance circuit 210 based on whether the current output from the rectification circuit 220 is the threshold current or more (hereinafter, denoted as a 'second method'), a method for controlling the switch included in the resonance circuit 210 based on whether the voltage standing wave ratio related to the first power is the threshold voltage standing wave ratio or more (hereinafter, denoted as a 'third method'), or a method for controlling the switch included in the resonance circuit 210 based on whether the phase of the impedance of the resonance circuit of the wireless power transmitter 102 is the threshold phase or more (hereinafter, denoted as a 'fourth method'), as described above.

In an embodiment, the controller 280 may set priorities for the first method to the fourth method. For example, the controller 280 may set the highest priority for the first method, set the second highest priority for the second method, and set the same priority for the third method and the fourth method. However, the method for setting priorities for the first method to the fourth method is not limited to the above-described example.

In an embodiment, when the distance between the wireless power transmitter 102 and the electronic device 100 is determined, the controller 280 may provide a control signal for controlling the switches (e.g., the switches 331, 333, and 351) included in the resonance circuit 210 to the resonance circuit 210 based on whether the determined distance between the wireless power transmitter 102 and the electronic device 100 is a designated distance or more. For example, the controller 280 may determine the distance between the wireless power transmitter 102 and the electronic device 100 using at least one table among the first table to the fourth table. Upon identifying that the determined distance between the wireless power transmitter 102 and the electronic device 100 is the designated distance or more, the controller 280 may provide a control signal for turning on the first switches 331 and 333 and the second switch 351 to the first switches 331 and 333 and the second switch 351 to allow the resonance circuit 210 to have the second connection setting. Upon identifying that the determined distance between the wireless power transmitter 102 and the electronic device 100 is less than the designated distance, the controller 280 may provide a control signal for turning off the first switches 331 and 333 and the second switch 351 to the first switches 331 and 333 and the second switch 351 to allow the resonance circuit 210 to have the first connection setting.

In an embodiment, the threshold voltage, threshold current, threshold voltage standing wave ratio, or threshold phase may be changed considering the hysteresis characteristics depending on whether the resonance circuit 210 is in the first connection setting or the second connection setting.

In an embodiment, the controller 280 may be a component independent from the communication circuit 270 as shown in FIG. 2. However, without limitations thereto, in an embodiment, the controller 280 and the communication circuit 270 may be implemented as a single integrated component (e.g., one chip).

In an embodiment, the controller 280 may be replaced with a processor (e.g., an application processor) capable of performing the above-described operations of the controller 280. Thus, it will be appreciated that the controller comprises processing circuitry.

In an embodiment, the controller 280, the rectification circuit 220, and the DC/DC converter 230 may be implemented as an integrated component (e.g., one chip) or may be implemented as one component further including the communication circuit 270.

Figure 5:
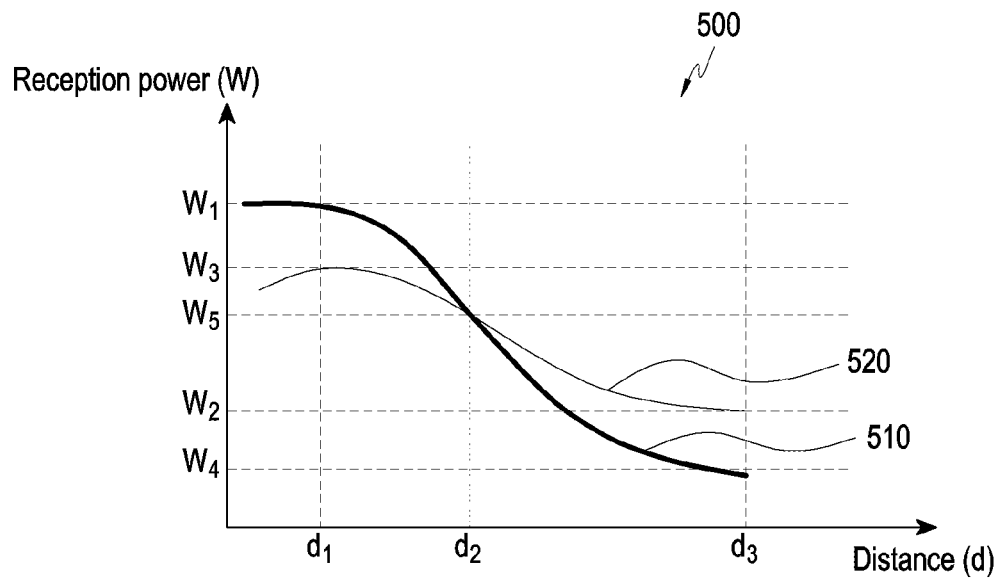
FIG. 5 is a view illustrating the power received by a load depending on the connection settings of a resonance circuit according to various example embodiments.

FIG. 5 is a view 500 illustrating the power received by a load depending on the connection settings of a resonance circuit 210 according to various embodiments.

Figure 6:
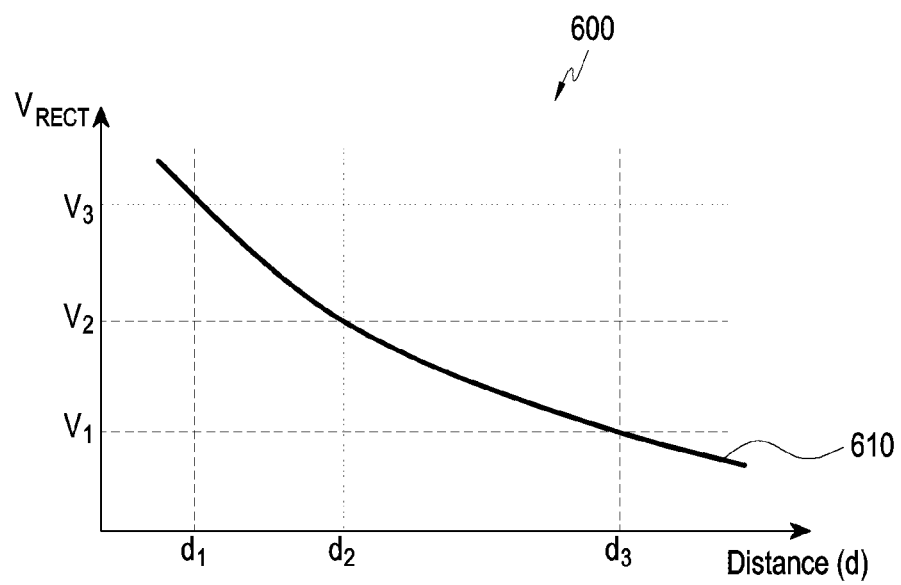
FIG. 6 is a view illustrating a method for setting a threshold voltage compared with the output voltage $V_{RECT}$ of a rectification circuit according to various example embodiments.

FIG. 6 is a view 600 illustrating a method for setting a threshold voltage compared with the output voltage $V_{RECT}$ of a rectification circuit 220 according to various embodiments.

Referring to FIGS. 5 and 6, in an embodiment, a first line 510 may denote the power (reception power W (Watt)) received by the load (e.g., the battery 250) depending on the distance d between the electronic device 100 and the wireless power transmitter 102 when the resonance circuit 210 is in the first connection setting (e.g., in the series connection state between the reception coil and the capacitor). For example, the first line 510 may denote the power received by the load (e.g., the battery 250) depending on the distance d between the electronic device 100 and the wireless power transmitter 102 when power is provided with the maximum efficiency to the load (e.g., the battery 250) when the distance d between the electronic device 100 and the wireless power transmitter 102 is $d_1$ (e.g., about 5 cm) (e.g., resonance is formed when the distance d between the electronic device 100 and the wireless power transmitter 102 is $d_1$) in the first connection setting of the resonance circuit 210. As in the first line 410 of FIG. 5, the power received by the load when the distance d between the electronic device 100 and the wireless power transmitter 102 is shorter than $d_1$ (e.g., $d_1$ or less) may be substantially the same or smaller than the power received by the load when the distance d between the electronic device 100 and the wireless power transmitter 102 is $d_1$.

In an embodiment, a second line 520 may denote the power (reception power W (Watt)) received by the load (e.g., the battery 250) depending on the distance d between the electronic device 100 and the wireless power transmitter 102 when the resonance circuit 210 is in the second connection setting (e.g., in the parallel connection state between the reception coil and the capacitor). For example, the second line 520 may denote the power received by the load (e.g., the battery 250) depending on the distance d between the electronic device 100 and the wireless power transmitter 102 when power is provided with the maximum or high efficiency to the load (e.g., the battery 250) when the distance d between the electronic device 100 and the wireless power transmitter 102 is $d_3$ (e.g., about 30 cm) (e.g., resonance is formed when the distance d between the electronic device 100 and the wireless power transmitter 102 is $d_3$) in the first connection setting of the resonance circuit 210.

In an embodiment, as in the first and second lines 510 and 520, as the distance between the wireless power transmitter 102 and the electronic device 100 increases, the power received by the load may decrease.

In an embodiment, as shown in FIG. 5, in a case where the distance d between the electronic device 100 and the wireless power transmitter 102 is less than $d_2$ (e.g., 10 cm), larger power may be transferred to the load (e.g., the battery 250) when the resonance circuit 210 is in the first connection setting than when the resonance circuit 210 is in the second connection setting. For example, when the distance d between the electronic device 100 and the wireless power transmitter 102 is $d_1$, power $W_3$ (e.g., about 4 W) may be transferred to the load (e.g., the battery 250) in the second connection setting of the resonance circuit 210 and, in the first connection setting of the resonance circuit 210, power $W_1$ (e.g., about 5 W) larger than power $W_3$ may be transferred to the load (e.g., the battery 250). In an embodiment, when the distance d between the electronic device 100 and the wireless power transmitter 102 is less than $d_2$, the first connection setting of the resonance circuit 210 may be a connection setting in which the power received from the wireless power transmitter 102 may be transferred to the load (e.g., the battery 250) with high efficiency as compared with the second connection setting of the resonance circuit 210.

In an embodiment, as shown in FIG. 5, in a case where the distance d between the electronic device 100 and the wireless power transmitter 102 is $d_2$ or more, larger power may be transferred to the load (e.g., the battery 250) when the resonance circuit 210 is in the second connection setting than when the resonance circuit 210 is in the first connection setting. For example, when the distance d between the electronic device 100 and the wireless power transmitter 102 is $d_3$, power $W_4$ may be transferred to the load (e.g., the battery 250) in the first connection setting of the resonance circuit 210 and, in the second connection setting of the resonance circuit 210, power $W_2$ (e.g., about 1 W) larger than power $W_4$ (e.g., about 0.5 W) may be transferred to the load (e.g., the battery 250). In an embodiment, when the distance d between the electronic device and the wireless power transmitter 102 is $d_2$ or more, the second connection setting of the resonance circuit 210 may be a connection setting in which the power received from the wireless power transmitter 102 may be transferred to the load (e.g., the battery 250) with high efficiency as compared with the first connection setting of the resonance circuit 210.

In an embodiment, the first line 510 of FIG. 5 may be related to Equation 4, and the second line 520 of FIG. 5 may be related to Equation 5 below.

$$P = |V(s)|^2 \cdot \left| \frac{1}{R_s + R_L + \frac{L_1 C_s s^2 + 1}{sC_s}} \right|^2 \cdot R_L \quad \text{[Equation 4]}$$

$$P = \frac{|V(s)|^2}{|sL_1 + (R_s + R_L)(1 + s^2 L_1 C_p)|^2} \cdot R_L \quad \text{[Equation 5]}$$

In Equation 4, P may denote the power received by the load when the resonance circuit 210 is in the first connection setting, V(s) (where s=j*w) may denote the voltage induced in the electronic device 100, $L_1$ may denote the inductance of the reception coil 310, Rs may denote the resistance viewed from the load, $R_L$ may denote the resistance of the load, and Cs may denote the capacitance of the capacitor connected in series with the reception coil (e.g., the equivalent capacitance of the capacitor 321 and the capacitor 323). In Equation 4, when ($L_1*Cs*S^2+1$) is about 0, resonance may be formed.

As shown in Equation 4, the magnitude of the reception power P of the load may be proportional to the square of the voltage V(s) induced in the electronic device 100. As the distance between the wireless power transmitter 102 and the electronic device 100 increases, the coupling coefficient k between the transmission coil (not shown) of the wireless power transmitter 102 and the reception coil 310 of the electronic device 100 may decrease. As the coupling coefficient k between the transmission coil (not shown) and the reception coil 310 of the electronic device 100 decreases, the voltage V(s) induced in the electronic device 100 may decrease. Accordingly, as the distance between the wireless power transmitter 102 and the electronic device 100 increases, the voltage V(s) induced in the electronic device 100 may decrease.

In Equation 5, P may denote the power received by the load when the resonance circuit 210 is in the first connection setting, V(s) may denote the voltage induced in the electronic device 100, $L_2$ may denote the inductance of the reception coil 310, Rs may denote the resistance viewed from the load, $R_L$ may denote the resistance of the load, and Cp may denote the capacitance of the capacitor 341 connected in parallel with the reception coil. In Equation 5, when ($1+S^2*L_1*Cp$) is about 0, resonance may be formed.

As shown in Equation 5, the magnitude of the reception power P of the load may be proportional to the square of the voltage V(s) induced in the electronic device 100. As the distance between the wireless power transmitter 102 and the electronic device 100 increases, the coupling coefficient k between the transmission coil (not shown) of the wireless power transmitter 102 and the reception coil 310 of the electronic device 100 may decrease. As the coupling coefficient k between the transmission coil (not shown) and the reception coil 310 of the electronic device 100 decreases, the voltage V(s) induced in the electronic device 100 may decrease. Accordingly, as the distance between the wireless power transmitter 102 and the electronic device 100 increases, the voltage V(s) induced in the electronic device 100 may decrease.

In an embodiment, as shown in FIG. 5, when the resonance circuit 210 is in the first connection setting (e.g., in the case of Equation 4) and the second connection setting (e.g., in the case of Equation 5), as the distance between the wireless power transmitter 102 and the electronic device 100 increases, the powers received by the load may be reduced differently (e.g., the degrees in which the powers received by the load are reduced may differ).

In a case where the wireless power transmitter 102 transmits a predetermined magnitude of power, as the distance d between the electronic device 100 and the wireless power transmitter 102 increases (e.g., as they get away from each other), the output voltage $V_{RECT}$ of the rectification circuit 220 may reduce. In FIG. 6, as shown in the third line 610, when the distance d between the electronic device 100 and the wireless power transmitter 102 is $d_1$, the output voltage $V_{RECT}$ of the rectification circuit 220 may be $V_3(V)$. $V_3(V)$ may be the output voltage $V_{RECT}$ of the rectification circuit 220 to allow the load (e.g., the battery 250) to receive $W_1(W)$ (or $W_3(W)$) in FIG. 5. When the distance d between the electronic device 100 and the wireless power transmitter 102 is $d_3$, the output voltage $V_{RECT}$ of the rectification circuit 220 may be $V_1(V)$. $V_1(V)$ may be the output voltage $V_{RECT}$ of the rectification circuit 220 to allow the load (e.g., the battery 250) to receive $W_2(W)$ (or $W_4(W)$).

In an embodiment, the controller 280 may set the threshold voltage to allow the resonance circuit 210 to have a connection setting (e.g., to switch to the connection setting) for transferring the power received from the wireless power transmitter 102 to the load (e.g., the battery 250) with high efficiency. For example, as shown in FIG. 5, when the distance d between the electronic device 100 and the wireless power transmitter 102 is less than $d_2$, in the first connection setting of the resonance circuit 210, the power received from the wireless power transmitter 102 may be transferred to the load with high efficiency. When the distance d between the electronic device 100 and the wireless power transmitter 102 is $d_2$, in the second connection setting of the resonance circuit 210, the power received from the wireless power transmitter 102 may be transferred to the load with high efficiency. The controller 280 may set $V_2(V)$, as the output voltage $V_{RECT}$ of the rectification circuit 220 corresponding to the distance $d_2$ between the electronic device 100 and the wireless power transmitter 102 where the first line 510 and second line 520 of FIG. 5 cross each other (e.g., measured when the distance d between the electronic device 100 and the wireless power transmitter 102 is $d_2$), as the threshold voltage. $V_2(V)$ may be the output voltage $V_{RECT}$ of the rectification circuit 220 to allow the load (e.g., the battery 250) to receive $W_5(W)$(e.g., about 3.5 W) when the distance d between the electronic device 100 and the wireless power transmitter 102 is $d_2$ (e.g., about 10 cm) in FIG. 5.

In connection with FIGS. 2 to 6, examples in which one electronic device 100 receives wireless power from the wireless power transmitter 102 have been described. However, the electronic device 100 may perform the same or similar operations to those described above even when a plurality of electronic devices receive wireless power from the wireless power transmitter 102.

For example, when the wireless power transmitter 102 simultaneously provides power to the electronic device 100 and at least one other electronic device, the wireless power transmitter 102 may receive information related to the power received by the electronic device 100 and the at least one other electronic device (e.g., the output voltage $V_{RECT}$ of the rectification circuit 220) from each of the electronic device and the at least one other electronic device. The electronic device 100 may receive the information related to the power received by at least one other electronic device through the communication circuit 270 from the wireless power transmitter 102. The electronic device 100 may adjust the threshold voltage to be compared with, e.g., the output voltage $V_{RECT}$ of the rectification circuit 220 based on the received information related to the power received by the at least one other electronic device. For example, when the electronic device receives power from the wireless power transmitter 102 without at least one other electronic device (e.g., alone), the electronic device 100 may set (e.g., apply) a low threshold voltage based on the information related to the power received by the at least one other electronic device as compared with when the electronic device 100, simultaneously with (or along with) the at least one other electronic device, receives power from the wireless power transmitter 102. In the above-described example, the electronic device 100 is exemplified as receiving information about the power received by at least one other electronic device through the wireless power transmitter 102. However, the electronic device 100 may receive the information about the power received by the at least one other electronic device directly from the at least one other electronic device through the communication circuit 270.

As another example, in a case where the wireless power transmitter 102 simultaneously provides power to the electronic device 100 and at least one other electronic device using a resonance scheme through resonance, when a change in the distance between the wireless power transmitter 102 and the at least one other electronic device, and the number of the at least one other electronic device, is small, the wireless power transmitter 102 may transmit substantially constant power. In this case, the power received from the wireless power transmitter 102 by the electronic device 100 may be varied depending on the number of the at least one other electronic device and the distance between the at least one other electronic device and the wireless power transmitter 102. The variation in the power received by the electronic device depending on the distance between the at least one other electronic device and the wireless power transmitter 102 and the number of the at least one other electronic device may be significantly small, and the variation in power may be disregarded when the electronic device 100 controls the switching operation of the switch (e.g., the switches 331, 333, and 351).

Although not described through FIGS. 2 to 6, in an embodiment, when the electronic device 100 and the wireless power transmitter 102 are communicatively connected, the controller 280 may automatically (e.g., without user input) identify (e.g., measure) the power received by the load (e.g., the battery 250) in each of the first connection setting of the resonance circuit 210 and the second connection setting of the resonance circuit 210. For example, when the electronic device 100 and the wireless power transmitter 102 are communicatively connected, the controller 280 may identify the power received by the load (e.g., the battery 250) in the first connection setting of the resonance circuit 210 and control the switch to allow the resonance circuit 210 to have the second connection setting based on the identified power. The controller 280 may identify the power received by the load (e.g., the battery 250) in the second connection setting. The controller 280 may identify the connection setting of the resonance circuit 210, which makes the power received by the load (e.g., the battery 250) large, of the first connection setting and the second connection setting. The controller 280 may control the switch (e.g., the switches 331, 333, and 351) to allow the resonance circuit 210 to have the identified connection setting, of the first connection setting and the second connection setting.

Figure 7:
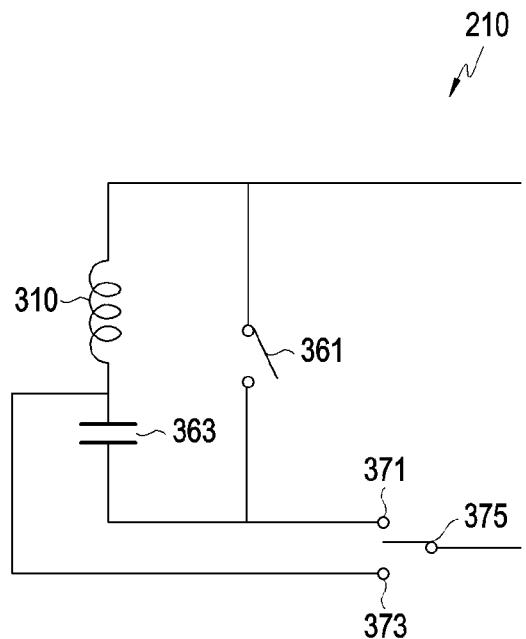
FIG. 7 is a view illustrating a resonance circuit according to various example embodiments.

FIG. 7 is a view illustrating a resonance circuit according to various embodiments.

Referring to FIG. 7, in an embodiment, a resonance circuit 210 may include a reception coil 310, a capacitor 363, a first switch 361, and a second switch 375.

In an embodiment, the first switch 361 and the second switch 375 may perform a switching operation to become a state in which the reception coil 310 and the capacitor 363 are connected in series (hereinafter, denoted as a 'first connection setting of the resonance circuit 210'). For example, when the first switch 361 is opened, and the second switch 375 are connected with the first node 371, the reception coil 310 and the capacitor 363 may be connected in series.

In an embodiment, the first switch 361 and the second switch 375 may perform a switching operation to become a state in which the reception coil 310 and the capacitor 363 are connected in parallel (hereinafter, denoted as a 'second connection setting of the resonance circuit 210'). For example, when the first switch 361 is closed, and the second switch 375 are connected with the second node 373, the reception coil 310 and the capacitor 363 may be connected in parallel.

In an embodiment, comparison between FIG. 7 and FIG. 3 reveals that the resonance circuit 210 of FIG. 7 may include fewer capacitors (e.g., one capacitor 363) and fewer switches 361 and 375 than the resonance circuit 210 of FIG. 3. In an embodiment, the controller 280 may perform the examples of the above-described operation of the controller 280 using the resonance circuit 210 of FIG. 7 and, to avoid duplication, no description of the operations of the controller 280 related to FIG. 7 is given.

Figure 8:
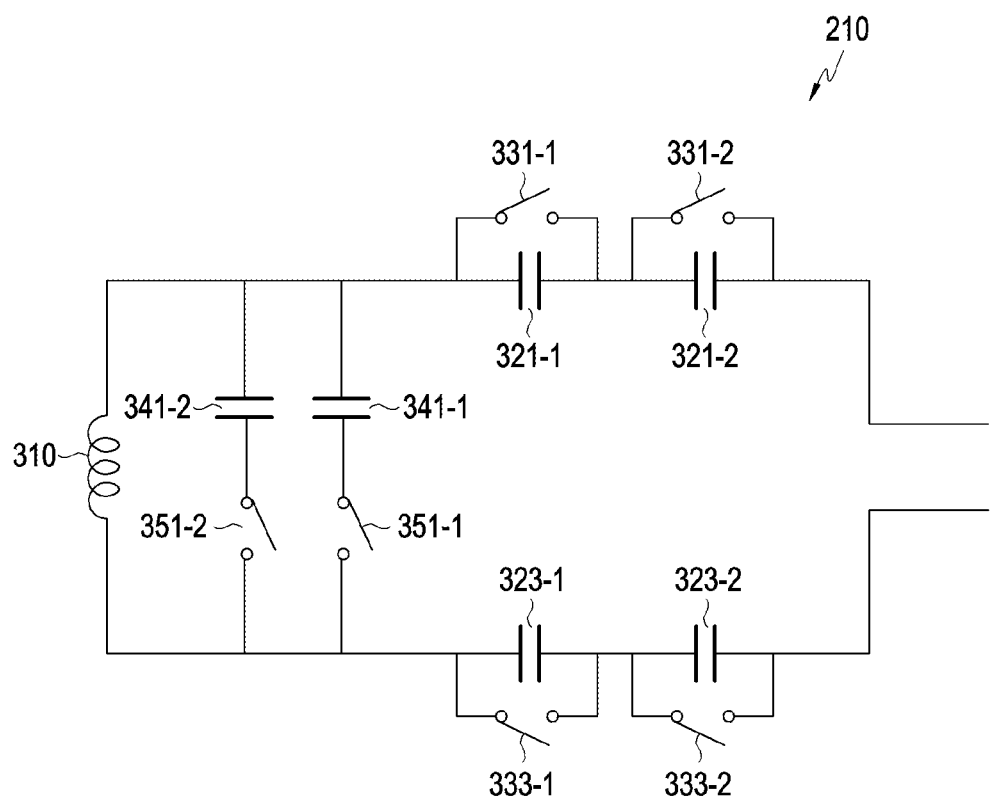
FIG. 8 is a view illustrating a resonance circuit according to various example embodiments.

FIG. 8 is a view illustrating a resonance circuit 210 according to various embodiments.

Referring to FIG. 8, in an embodiment, a resonance circuit 210 may include a reception coil 310, a plurality of first capacitors 321-1, 321-2, 323-1, and 323-2 connected in series with the reception coil 310, a plurality of first switches 331-1, 331-2, 333-1, and 333-2 respectively connected in parallel with the plurality of first capacitors 321-1, 321-2, 323-1, and 323-2, a plurality of second capacitors 341-1 and 341-2 connected in parallel with the reception coil 310, and a plurality of second switches 351-1 and 351-2 respectively connected in series with the plurality of second capacitors 341-1 and 341-2.

In an embodiment, when the rectification circuit 220 connected to the resonance circuit 210 includes a full-bridge circuit, the resonance circuit may include a plurality of first capacitors 321-1, 321-2, 323-1, and 323-2 and a plurality of first switches 331-1, 331-2, 333-1, and 333-2 as shown in FIG. 8. In an embodiment, the equivalent capacitance of the capacitor 321-1 and the capacitor 321-2 may be the same as the equivalent capacitance of the capacitor 323-1 and the capacitor 323-2. In an embodiment, when the rectification circuit 220 connected to the resonance circuit 210 includes a half-bridge circuit, the resonance circuit 210 may include two capacitors. For example, when the rectification circuit 220 connected to the resonance circuit 210 includes a half-bridge circuit, the capacitors 323-1 and 323-2 among the plurality of first capacitors 321-1, 321-2, 323-1, and 323-2 and the switches 333-1 and 333-2 connected in parallel with the capacitors 323-1 and 323-2 among the plurality of first switches 331-1, 331-2, 333-1, and 333-2 may be omitted, and the capacitors 321-1 and 321-2, respectively, may be replaced with two capacitors whose capacitance is ½ (e.g., 1/(2*C1)) of the same capacitance (e.g., C1) of the capacitors 321-1 and 321-2. However, without limitations thereto, the capacitors 321-1 and 321-2 among the plurality of first capacitors 321-1, 321-2, 323-1, and 323-2 and the switches 331-1 and 331-2 connected in parallel with the capacitors 321-1 and 321-2 among the plurality of first switches 331-1, 331-2, 333-1, and 333-2 may be omitted, and the capacitors 323-1 and 323-2, respectively, may be replaced with two capacitors whose capacitance is ½ (e.g., 1/(2*C1)) of the same capacitance (e.g., C1) of the capacitors 323-1 and 323-2.

In an embodiment, the plurality of first switches 331-1, 331-2, 333-1, and 333-2 and the plurality of second switches 351-1 and 351-2 may perform a switching operation to have a connection setting (hereinafter, denoted as a 'first connection setting of the resonance circuit 210') in which some 321-1 and 323-1 of the plurality of first capacitors 321-1, 321-2, 323-1, and 323-2 are electrically connected in series with the reception coil 310, and others 321-2 and 323-2 of the plurality of first capacitors 321-1, 321-2, 323-1, and 323-2 and the plurality of second capacitors 341-1 and 341-2 are not electrically connected with the reception coil 310.

In an embodiment, the plurality of first switches 331-1, 331-2, 333-1, and 333-2 and the plurality of second switches 351-1 and 351-2 may perform a switching operation to have a connection setting (hereinafter, denoted as a 'second connection setting of the resonance circuit 210') in which some 341-1 of the plurality of second capacitors 341-1 and 341-2 is electrically connected with the reception coil 310, and some other 341-2 of the plurality of first capacitors 321-1, 321-2, 323-1, and 323-2 and the plurality of second capacitors 341-1 and 341-2 is not electrically connected with the reception coil 310.

In an embodiment, the plurality of first switches 331-1, 331-2, 333-1, and 333-2 and the plurality of second switches 351-1 and 351-2 may perform a switching operation to have a connection setting (hereinafter, denoted as a 'third connection setting of the resonance circuit 210') in which the plurality of first capacitors 321-1, 321-2, 323-1, and 323-2 are electrically connected in series with the reception coil 310, and the plurality of second capacitors 341-1 and 341-2 are electrically connected in parallel with the reception coil 310.

In an embodiment, the plurality of first capacitors 321-1, 321-2, 323-1, and 323-2 and the plurality of second capacitors 341-1 and 341-2, respectively, may have capacitances to form resonance at the same frequency in the first connection setting, the second connection setting, and the third connection setting of the resonance circuit 210.

For example, the equivalent capacitance of some 321-1 and 323-1 among the plurality of first capacitors may be equal to the capacitances of the plurality of second capacitors 341-1 to form resonance at the same frequency in the first connection setting and second connection setting of the resonance circuit. For the third connection setting of the resonance circuit to form resonance at the same frequency as those of the first connection setting and second connection setting of the resonance circuit, the equivalent capacitance of the equivalent capacitance of the plurality of first capacitors 321-1, 321-2, 323-1, and 323-2 and the equivalent capacitance of the plurality of second capacitors 341-1 and 341-2 (e.g., the sum of the equivalent capacitance of the plurality of first capacitors 321-1, 321-2, 323-1, and 323-2 and the equivalent capacitance of the plurality of second capacitors 341-1 and 341-2) may be equal to the equivalent capacitance of some 321-1 and 323-1 of the plurality of first capacitors and the capacitance of the plurality of second capacitors 341-1.

In an embodiment, the impedance of the first connection setting of the resonance circuit 210 may be smaller than the impedance of the third connection setting of the resonance circuit 210. The impedance of the third connection setting of the resonance circuit 210 may be smaller than the impedance of the second connection setting of the resonance circuit 210.

In an embodiment, the first connection setting of the resonance circuit 210 may be a connection setting in which when the power received from the wireless power transmitter 102 is a designated power (hereinafter, denoted as 'first reception power') or more, the power received from the wireless power transmitter 102 may be transferred to a load (e.g., the battery 250) with high efficiency as compared with the second connection setting and the third connection setting of the resonance circuit 210.

In an embodiment, the third connection setting of the resonance circuit 210 may be a connection setting in which when the power received from the wireless power transmitter 102 is less than the first reception power and is not less than a designated power (hereinafter, denoted as 'second reception power'), the power received from the wireless power transmitter 102 may be transferred to the load (e.g., the battery 250) with high efficiency as compared with the first connection setting and the second connection setting of the resonance circuit 210.

In an embodiment, the second connection setting of the resonance circuit 210 may be a connection setting in which when the power received from the wireless power transmitter 102 is less than the second reception power, the power received from the wireless power transmitter 102 may be transferred to a load (e.g., the battery 250) with high efficiency as compared with the second connection setting and the third connection setting of the resonance circuit 210.

In an embodiment, when additional capacitors (and corresponding switches) are included as compared with the resonance circuit 210 of FIG. 3, like the resonance circuit 210 of FIG. 8, the controller 280 may set a plurality of threshold values to be compared with the value measured in the electronic device 100 (e.g., the output voltage $V_{RECT}$ of the rectification circuit 220, the current output from the rectification circuit 220, the voltage standing wave ratio related to the power transmitted by the wireless power transmitter 102, or the phase of the impedance of the resonance circuit of the wireless power transmitter 102).

Figure 9:
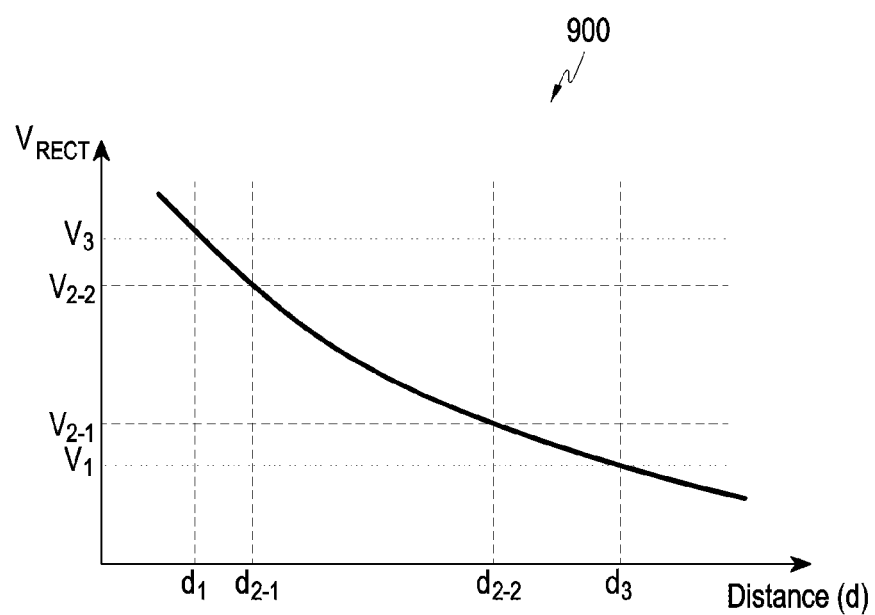
FIG. 9 is a view illustrating a method for setting a plurality of threshold voltages compared with the output voltage $V_{RECT}$ of a rectification circuit according to various example embodiments.

FIG. 9 is a view 900 illustrating a method for setting a plurality of threshold voltages compared with the output voltage $V_{RECT}$ of a rectification circuit 220 according to various embodiments.

Referring to FIG. 9, in an embodiment, in a case where the wireless power transmitter 102 transmits a predetermined magnitude of power, as the distance d between the electronic device 100 and the wireless power transmitter 102 increases (e.g., as they get away from each other), the output voltage $V_{RECT}$ of the rectification circuit 220 may reduce. In FIG. 9, when the distance d between the electronic device 100 and the wireless power transmitter 102 is $d_1$ (e.g., about 5 cm), the output voltage $V_{RECT}$ of the rectification circuit 220 may be $V_3(V)$ (e.g., about 15V). When the distance d between the electronic device 100 and the wireless power transmitter 102 is $d_3$ (e.g., about 30 cm), the output voltage $V_{RECT}$ of the rectification circuit 220 may be $V_1(V)$ (e.g., about 5V).

In an embodiment, the controller 280 may set the plurality of threshold voltages to allow the resonance circuit 210 to have a connection setting (e.g., to switch to the state) for transferring the power received from the wireless power transmitter 102 to the load (e.g., the battery 250) with high efficiency. For example, as shown in FIG. 9, when the distance d between the electronic device 100 and the wireless power transmitter 102 is less than $d_{2-1}$ (e.g., about 8 cm), in the first connection setting of the resonance circuit 210, the power received from the wireless power transmitter 102 may be transferred to the load with high efficiency, as compared with the second connection setting and the third connection setting. When the distance d between the electronic device 100 and the wireless power transmitter 102 is $d_{2-1}$ or more and is less than $d_{2-2}$ (e.g., about 22 cm), in the third connection setting of the resonance circuit 210, the power received from the wireless power transmitter 102 may be transferred to the load with high efficiency, as compared with the first connection setting and the second connection setting. When the distance d between the electronic device 100 and the wireless power transmitter 102 is $d_{2-2}$ or more, in the second connection setting of the resonance circuit 210, the power received from the wireless power transmitter 102 may be transferred to the load with high efficiency, as compared with the first connection setting and the third connection setting.

The controller 280 may set the output voltage $V_{RECT}$ of the rectification circuit 220, identified (e.g., measured) when the distance d between the electronic device 100 and the wireless power transmitter 102 is $d_{2-1}$ (e.g., about 8 cm) as a first threshold voltage (e.g., $V_{2-2}$) (e.g., about 12V). The controller 280 may set the output voltage $V_{RECT}$ of the rectification circuit 220, identified (e.g., measured) when the distance d between the electronic device and the wireless power transmitter 102 is $d_{2-2}$ (e.g., about 22 cm) as a second threshold voltage (e.g., $V_{2-1}$) (e.g., about 6V).

Although not shown in FIGS. 8 and 9, in an embodiment, the controller 280 may set a plurality of threshold values to be compared with the current output from the rectification circuit 220, the voltage standing wave ratio of the wireless power transmitter 102, or the phase of the impedance of the resonance circuit of the wireless power transmitter 102 in the same or similar manner as the method for setting a plurality of threshold voltages to be compared with the output voltage $V_{RECT}$ of the rectification circuit 220 described in connection with FIG. 9.

In an embodiment, as compared with the resonance circuit 210 of FIG. 3, the resonance circuit 210 of FIG. 8 may be implemented to have a third connection setting, in addition to the first connection setting and the second connection setting, by further including capacitors (e.g., 321-2 and 323-2) (and corresponding switches 331-2 and 333-2) electrically connectable in series with the reception coil 310 and a capacitor (e.g., 351-2) (and corresponding switch 341-2) electrically connectable in parallel with the reception coil 310.

In an embodiment, when, as compared with the resonance circuit 210 of FIG. 8, the resonance circuit 210 further includes at least one capacitor (and at least one corresponding switch) electrically connectable in series with the reception coil 310 and at least one capacitor (and at least one corresponding switch) electrically connectable in parallel with the reception coil 310, the resonance circuit 210 may be implemented to have at least one fourth connection setting having an impedance different from the impedance of each of the first connection setting, the second connection setting, and the third connection setting, in addition to the first connection setting, the second connection setting, and the third connection setting.

In an embodiment, when the resonance circuit 210 is implemented to have at least one fourth connection setting, the controller 280 may allow the power received from the wireless power transmitter 102 to be transferred to the load (e.g., the battery 250) with higher efficiency by controlling the switching operation of the switch depending on the distance between the wireless power transmitter 102 and the electronic device in the same or similar manner as those in the above-described examples.

Figure 10:
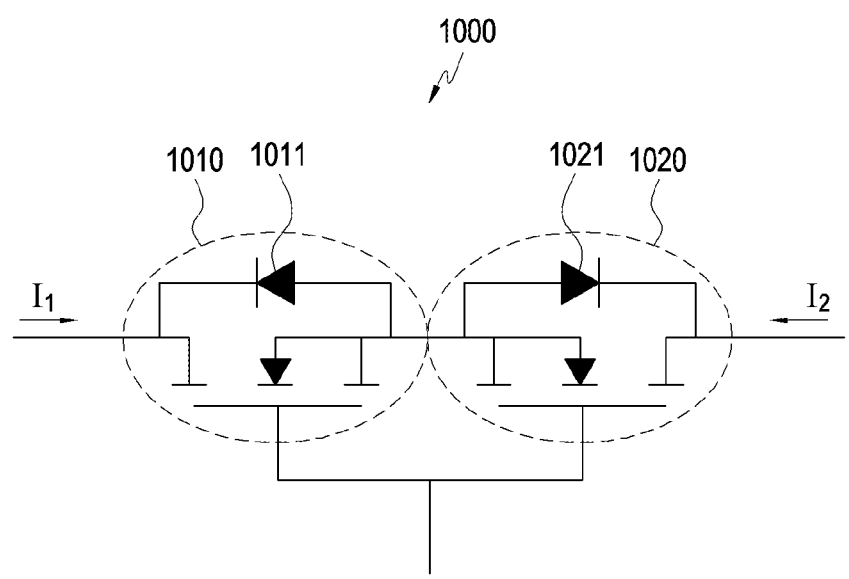
FIG. 10 is a view illustrating a configuration of a switch according to various example embodiments.

FIG. 10 is a view 1000 illustrating a configuration of a switch according to various embodiments.

Referring to FIG. 10, in an embodiment, switches 1010 and 1020 may be switches constituting the first switches 331 and 333 and the second switch 351, respectively.

In an embodiment, the switch 1010 and the switch 1020 may be implemented as N-channel MOSFETs whose respective sources are connected in series to have a common source voltage. The diode 1011 may be a body diode of the switch 1010, and the diode 1021 may be a body diode of the switch 1020. However, without limitations thereto, the switch 1010 and the switch 1020 may be implemented as P-channel MOSFETs whose respective drains are connected in series to have a common drain voltage.

In an embodiment, when the switch 1010 and the switch 1020 are in an on state, the AC current $I_1$ output from the reception coil 310 may flow from the drain of the switch 1010 to the source in the switch 1010 and then through the diode 1021, and the AC current $I_2$ may flow from the drain of the switch 1020 to the source in the switch 1010 and then through the diode 1011. In an embodiment, when the switch 1010 and the switch 1020 are in an off state, current may not flow through the switch 1010 and the switch 1020. Further, since the diode 1011 and the diode 1021 have opposite directions, they are not simultaneously turned on, so that no current flows through the diode.

Figure 11:
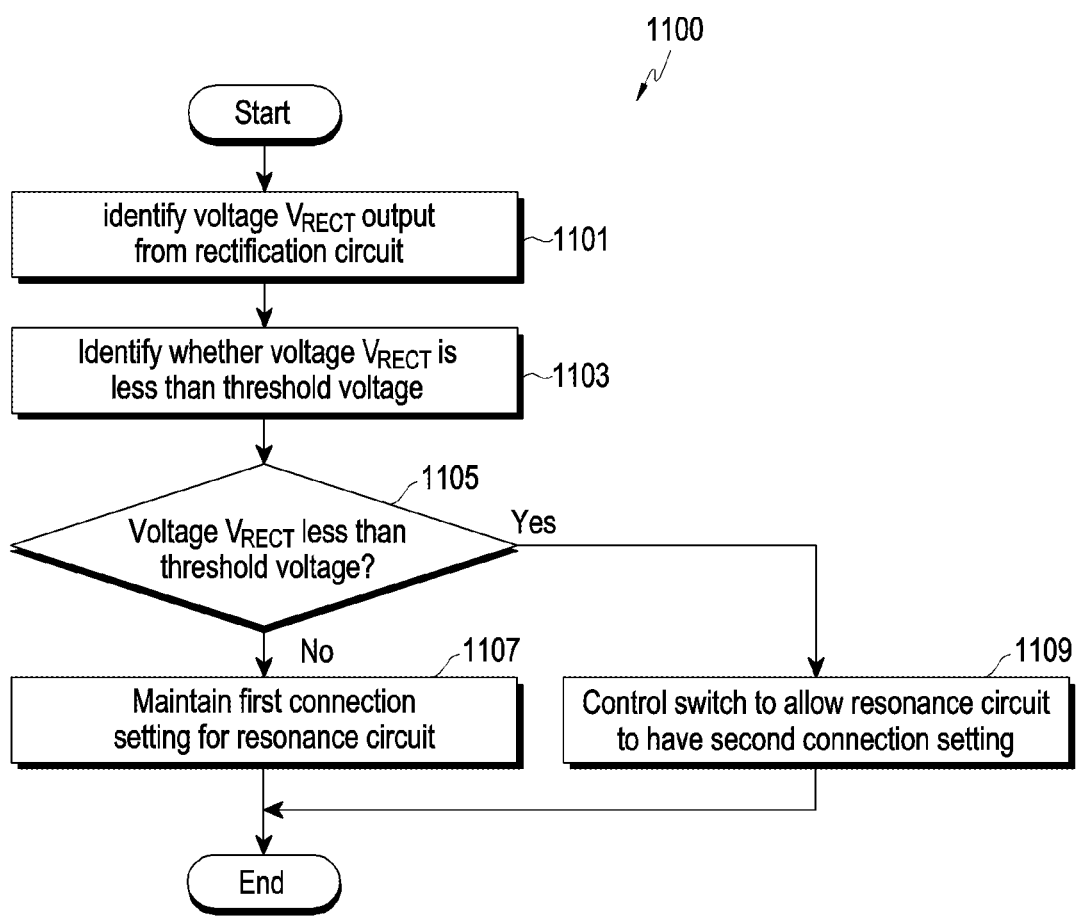
FIG. 11 is a view illustrating a method for controlling a switch based on the output voltage $V_{RECT}$ of a rectification circuit according to various example embodiments.

FIG. 11 is a view 1100 illustrating a method for controlling a switch based on the output voltage $V_{RECT}$ of a rectification circuit according to various embodiments.

In an embodiment, FIG. 11 may assume that the resonance circuit 210 is initially in the first connection setting.

Referring to FIGS. 2, 3, 7, and 11, in operation 1101, in an embodiment, the controller 280 may identify the voltage $V_{RECT}$ output from the rectification circuit 220.

In an embodiment, the controller 280 may identify the output $V_{RECT}$ of the rectification circuit 220 detected through the voltage detection circuit 260 while performing the operation for charging the battery 250. In an embodiment, the controller 280 may determine the distance between the wireless power transmitter 102 and the electronic device 100 based on the identified voltage $V_{RECT}$ output from the rectification circuit 220.

In an embodiment, the controller 280 may identify the current flowing through the over-voltage protection circuit.

In an embodiment, the controller 280 may receive information about the voltage standing wave ratio of the wireless power transmitter 102 through the communication circuit 270 from the wireless power transmitter 102 and identify the voltage standing wave ratio of the wireless power transmitter 102.

In an embodiment, the controller 280 may receive information about the phase of the impedance of the resonance circuit of the wireless power transmitter 102 from the wireless power transmitter 102 through the communication circuit 270 and identify the phase of the impedance of the resonance circuit of the wireless power transmitter 102.

In operation 1103, in an embodiment, the controller 280 may identify whether the output voltage $V_{RECT}$ of the rectification circuit 220 is less than a threshold voltage.

In an embodiment, the controller 280 may determine whether the distance between the wireless power transmitter 102 and the electronic device 100 is a designated distance or more to change (or maintain) the first connection setting of the resonance circuit 210.

In an embodiment, the controller 280 may identify whether the identified current (e.g., the current flowing to the over-voltage protection circuit) is less than a threshold current.

In an embodiment, the controller 280 may determine whether the voltage standing wave ratio is less than a threshold voltage standing wave ratio.

In an embodiment, the controller 280 may determine whether the phase of impedance is a threshold phase or more.

In operation 1105, upon identifying that the output voltage $V_{RECT}$ of the rectification circuit 220 is not less than the threshold voltage, in operation 1107, in an embodiment, the controller 280 may maintain the resonance circuit 210 in the first connection setting.

In an embodiment, when the distance between the wireless power transmitter 102 and the electronic device 100 is determined to be not the designated distance or more, the controller 280 may maintain the resonance circuit 210 in the first connection setting.

In an embodiment, upon identifying that the identified current is not less than the threshold current, the controller 280 may maintain the resonance circuit 210 in the first connection setting.

In an embodiment, upon identifying that the voltage standing wave ratio is not less than the threshold voltage standing wave ratio, the controller 280 may maintain the resonance circuit 210 in the first connection setting.

In an embodiment, upon identifying that the phase of impedance is not the threshold phase or more, the controller 280 may maintain the resonance circuit 210 in the first connection setting.

In an embodiment, the controller 280 may control the switches 331, 333, 351, 361, and 375 to maintain the resonance circuit 210 in the first connection setting. In an embodiment, the controller 280 may transfer a first control signal to the switch to maintain the resonance circuit 210 in the first connection setting.

In operation 1105, upon identifying that the output voltage $V_{RECT}$ of the rectification circuit 220 is less than the threshold voltage, in operation 1109, in an embodiment, the controller 280 may control the switch (e.g., the switches 331, 333, 351, 361, and 375) to allow the resonance circuit 210 to have the second connection setting In an embodiment, when the distance between the wireless power transmitter 102 and the electronic device 100 is determined to be the designated distance or more, the controller 280 may control the switch (e.g., the switches 331, 333, 351, 361, and 375) to allow the resonance circuit 210 to have the second connection setting.

in an embodiment, upon identifying that the identified current is less than the threshold current, the controller 280 may control the switch (e.g., the switches 331, 333, 351, 361, and 375) to allow the resonance circuit 210 to have the second connection setting.

In an embodiment, upon identifying that the voltage standing wave ratio is less than the threshold voltage standing wave ratio, the controller 280 may control the switch (e.g., the switches 331, 333, 351, 361, and 375) to allow the resonance circuit 210 to have the second connection setting.

In an embodiment, upon identifying that the phase of impedance is the threshold phase or more, the controller 280 may control the switch (e.g., the switches 331, 333, 351, 361, and 375) to allow the resonance circuit 210 to have the second connection setting.

In an embodiment, the controller 280 may transfer a second control signal to the switch (e.g., the switches 331, 333, 351, 361, and 375) to allow the resonance circuit 210 to have the second connection setting.

Although FIG. 11 exemplifies that the electronic device 100 receives power from the wireless power transmitter 102, in an embodiment, the controller 280 may maintain the first connection setting of the resonance circuit 210 when power is not received by the electronic device 100 from the wireless power transmitter 102. For example, the controller 280 may maintain the open state of the switches 331, 333, and 351 so that the reception coil 310 and the capacitors 321 and 323 are connected in series.

Figure 12:
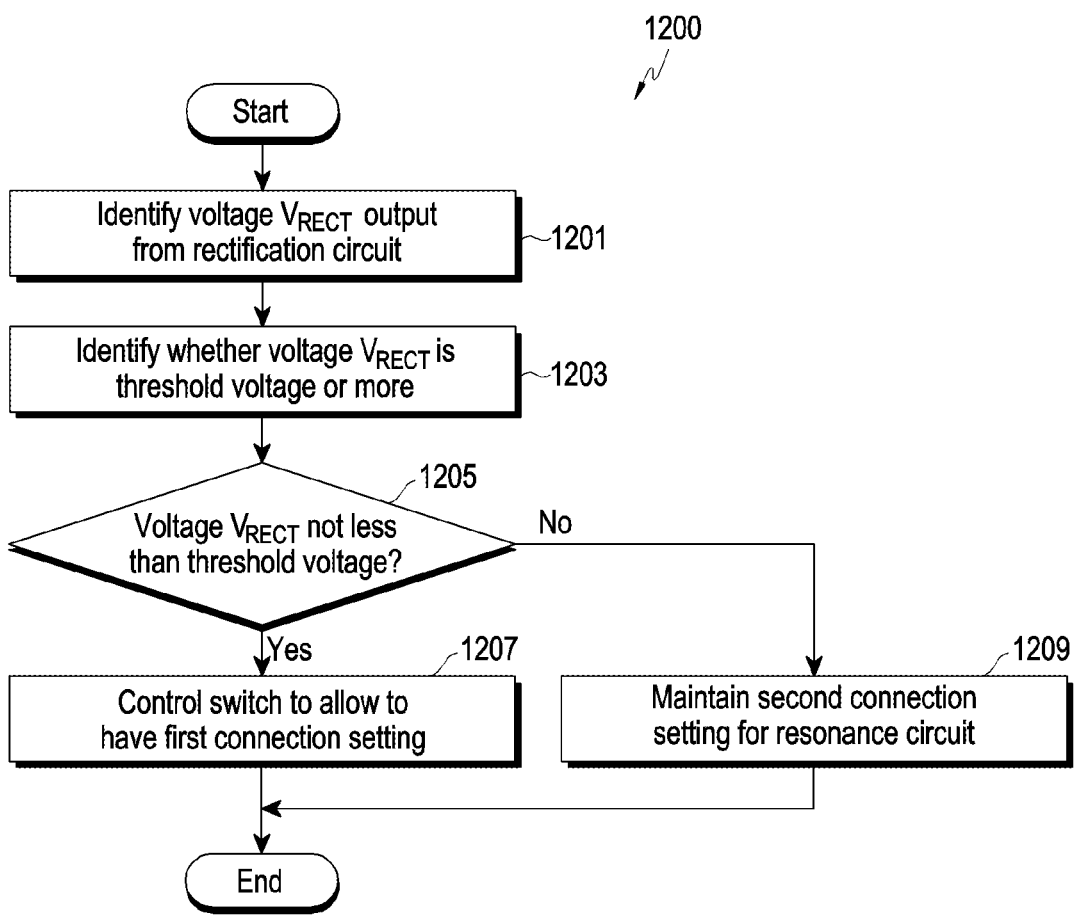
FIG. 12 is a view illustrating a method for controlling a switch based on the output voltage of a rectification circuit according to various example embodiments.

FIG. 12 is a view 1200 illustrating a method for controlling a switch based on the output voltage of a rectification circuit according to various embodiments.

In an embodiment, FIG. 12 may assume that the resonance circuit 210 is initially in the second connection setting.

Referring to FIGS. 2, 3, 7, and 11, in operation 1201, in an embodiment, the controller 280 may identify the voltage $V_{RECT}$ output from the rectification circuit 220.

In an embodiment, the controller 280 may identify the output $V_{RECT}$ of the rectification circuit 220 detected through the voltage detection circuit 260 while performing the operation for charging the battery 250. In an embodiment, the controller 280 may determine the distance between the wireless power transmitter 102 and the electronic device 100 based on the identified voltage VRECT output from the rectification circuit 220.

In an embodiment, the controller 280 may identify the current flowing through the over-voltage protection circuit.

In an embodiment, the controller 280 may receive information about the voltage standing wave ratio of the wireless power transmitter 102 through the communication circuit 270 from the wireless power transmitter 102 and identify the voltage standing wave ratio of the wireless power transmitter 102.

In an embodiment, the controller 280 may receive information about the phase of the impedance of the resonance circuit of the wireless power transmitter 102 from the wireless power transmitter 102 through the communication circuit 270 and identify the phase of the impedance of the resonance circuit of the wireless power transmitter 102.

In operation 1203, in an embodiment, the controller 280 may identify whether the output voltage $V_{RECT}$ of the rectification circuit 220 is a threshold voltage or more.

In an embodiment, the controller 280 may determine whether the distance between the wireless power transmitter 102 and the electronic device 100 is less than the designated distance to change (or maintain) the second connection setting of the resonance circuit 210.

In an embodiment, the controller 280 may identify whether the identified current (e.g., the current flowing to the over-voltage protection circuit) is a threshold current or more.

In an embodiment, the controller 280 may determine whether the voltage standing wave ratio is a threshold voltage standing wave ratio or more.

In an embodiment, the controller 280 may determine whether the phase of impedance is less than a threshold phase or more.

In operation 1205, upon identifying that the output voltage $V_{RECT}$ of the rectification circuit 220 is the threshold voltage or more, in operation 1207, in an embodiment, the controller 280 may control the switch (e.g., the switches 331, 333, 351, 361, and 375) to allow the resonance circuit 210 to have the first connection setting In an embodiment, when the distance between the wireless power transmitter 102 and the electronic device 100 is determined to be less than the designated distance, the controller 280 may control the switch (e.g., the switches 331, 333, 351, 361, and 375) to allow the resonance circuit 210 to have the first connection setting.

in an embodiment, upon identifying that the identified current is the threshold current or more, the controller 280 may control the switch (e.g., the switches 331, 333, 351, 361, and 375) to allow the resonance circuit 210 to have the first connection setting.

In an embodiment, upon identifying that the voltage standing wave ratio is the threshold voltage standing wave ratio or more, the controller 280 may control the switch (e.g., the switches 331, 333, 351, 361, and 375) to allow the resonance circuit 210 to have the first connection setting.

In an embodiment, upon identifying that the phase of impedance is less than the threshold phase, the controller 280 may control the switch (e.g., the switches 331, 333, 351, 361, and 375) to allow the resonance circuit 210 to have the first connection setting.

In an embodiment, the controller 280 may transfer a first control signal to the switch to allow the resonance circuit 210 to have the first connection setting.

In operation 1205, upon identifying that the output voltage $V_{RECT}$ of the rectification circuit 220 is not the threshold voltage or more, in operation 1209, in an embodiment, the controller 280 may maintain the resonance circuit 210 in the second connection setting.

In an embodiment, when the distance between the wireless power transmitter 102 and the electronic device 100 is determined to be not less than the designated distance, the controller 280 may maintain the resonance circuit 210 in the second connection setting.

In an embodiment, upon identifying that the identified current is not the threshold current or more, the controller 280 may maintain the resonance circuit 210 in the second connection setting.

In an embodiment, upon identifying that the voltage standing wave ratio is not the threshold voltage standing wave ratio or more, the controller 280 may maintain the resonance circuit 210 in the second connection setting.

In an embodiment, upon identifying that the phase of impedance is not less than the threshold phase, the controller 280 may maintain the resonance circuit 210 in the second connection setting.

In an embodiment, the controller 280 may transfer a second control signal to the switch (e.g., the switches 331, 333, 351, 361, and 375) to allow the resonance circuit 210 to have the second connection setting.

In an embodiment, the controller 280 may not transfer a control signal to the switch to maintain the resonance circuit 210 in the second connection setting. In an embodiment, the controller 280 may transfer a second control signal to the switch to maintain the resonance circuit 210 in the second connection setting.

Although FIG. 12 exemplifies that the electronic device 100 receives power from the wireless power transmitter 102, in an embodiment, the controller 280 may maintain the second connection setting of the resonance circuit 210 when power is not received by the electronic device 100 from the wireless power transmitter 102. For example, the controller 280 may maintain the closed state of the switches 331, 333, and 351 so that the reception coil 310 and the capacitor 341 are connected in parallel.

Figure 13:
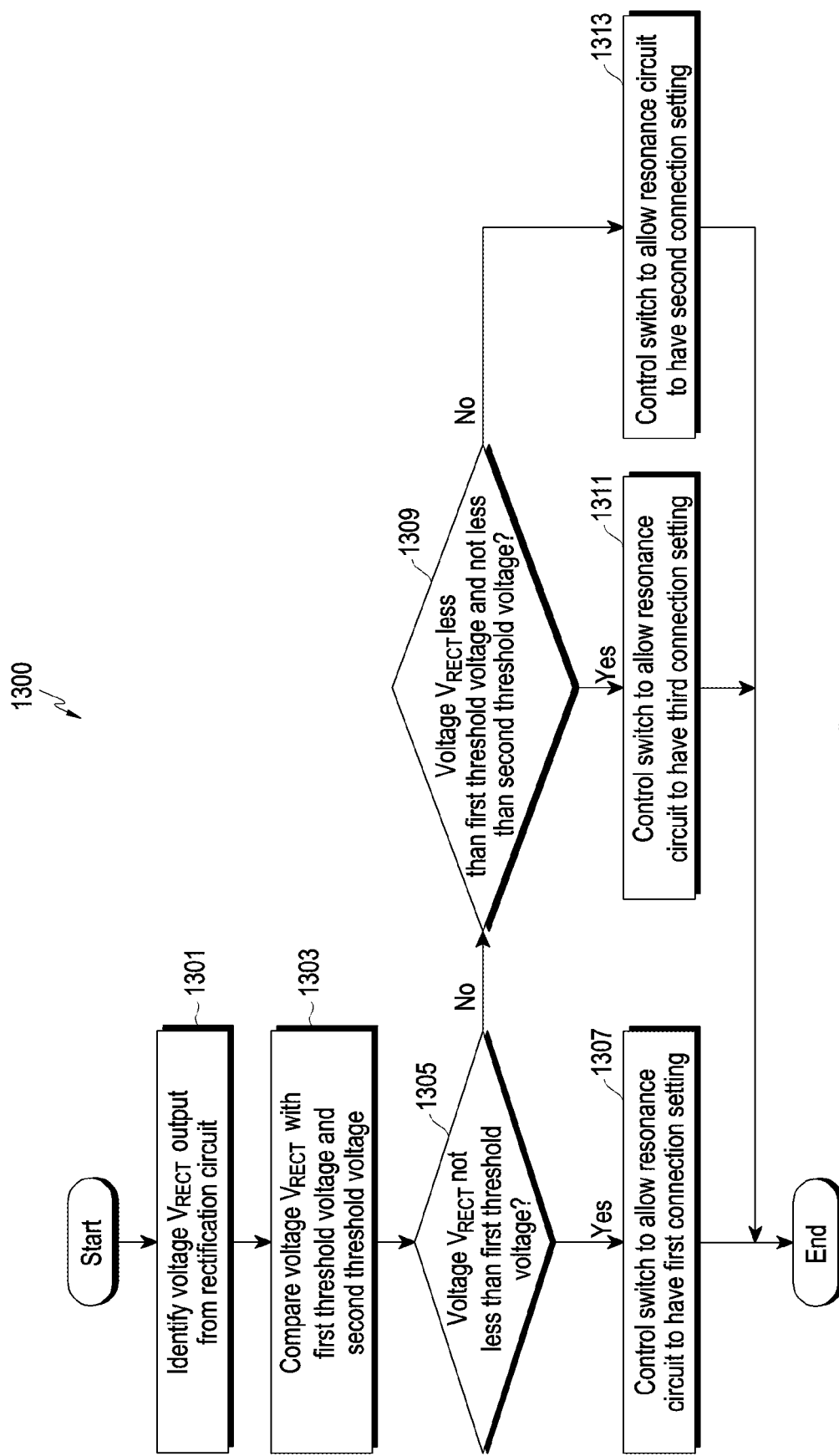
FIG. 13 is a view illustrating a method for controlling a switch based on the output voltage $V_{RECT}$ of a rectification circuit according to various example embodiments.

FIG. 13 is a view 1000 illustrating a method for controlling a switch (e.g., the switches 331, 333, and 351) based on the output voltage $V_{RECT}$ of a rectification circuit 220 according to various embodiments.

Referring to FIGS. 2, 8, and 13, in operation 1001, in an embodiment, the controller 280 may identify the voltage $V_{RECT}$ output from the rectification circuit 220.

Since operation 1301 is at least partially the same or similar to the operation 1101 of FIG. 11, no detailed description thereof is presented below.

In operation 1303, the controller 280 may compare the voltage $V_{RECT}$ output from the rectification circuit 220 with a first threshold voltage and a second threshold voltage. In an embodiment, the magnitude of the first threshold voltage may be larger than the magnitude of the second threshold voltage.

In operation 1305, upon identifying that the output voltage $V_{RECT}$ of the rectification circuit 220 is the first threshold voltage or more, in operation 1307, in an embodiment, the controller 280 may control the switch to allow the resonance circuit 210 to have the first connection setting In an embodiment, the first connection setting of the resonance circuit 210 may be when, in FIG. 8, the plurality of first switches 331-1, 331-2, 333-1, and 333-2 and the plurality of second switches 351-1 and 351-2 have a state in which some 321-1 and 323-1 of the plurality of first capacitors 321-1, 321-2, 323-1, and 323-2 are electrically connected in series with the reception coil 310, and others 321-2 and 323-2 of the plurality of first capacitors 321-1, 321-2, 323-1, and 323-2 and the plurality of second capacitors 341-1 and 341-2 are not electrically connected with the reception coil 310.

In operation 1309, upon identifying that the voltage $V_{RECT}$ output from the rectification circuit 220 is less than the first threshold voltage and not less than the second threshold voltage, in operation 1311, the controller 280 may control the switch to allow the resonance circuit 210 to have the third connection setting.

In an embodiment, the third connection setting of the resonance circuit 210 may be when the plurality of first switches 331-1, 331-2, 333-1, and 333-2 and the plurality of second switches 351-1 and 351-2 have a connection setting in which the plurality of first capacitors 321-1, 321-2, 323-1, and 323-2 are electrically connected in series with the reception coil 310, and the plurality of second capacitors 341-1 and 341-2 are electrically connected in parallel with the reception coil 310.

In operation 1309, upon identifying that the voltage $V_{RECT}$ output from the rectification circuit 220 is less than the second threshold voltage, in operation 1313, the controller 280 may control the switch to allow the resonance circuit 220 to have the second connection setting.

In an embodiment, the second connection setting of the resonance circuit 210 may be when the plurality of first switches 331-1, 331-2, 333-1, and 333-2 and the plurality of second switches 351-1 and 351-2 have a connection setting in which some 341-1 of the plurality of second capacitors 341-1 and 341-2 are electrically connected with the reception coil 310, and others 341-2 of the plurality of first capacitors 321-1, 321-2, 323-1, and 323-2 and the plurality of second capacitors 341-1 and 341-2 are not electrically connected with the reception coil 310.

In FIG. 13, upon identifying that the voltage $V_{RECT}$ output from the rectification circuit 220 is the first threshold voltage or more in operation 1305, in operation 1309, it is identified whether the voltage $V_{RECT}$ output from the rectification circuit is less than the first threshold voltage and not less than the second threshold voltage, but is not limited thereto. For example, in operation 1303, the controller 280 may compare the voltage $V_{RECT}$ output from the rectification circuit 220 with a first threshold voltage and a second threshold voltage. The controller may identify a range where the voltage VRECT output from the rectification circuit 220 belongs among a range not less than the first threshold voltage, a range not less than the second threshold voltage and less than the first threshold voltage, and a range less than the second threshold voltage. The controller 280 may control the switch to allow the resonance circuit 210 to have the connection setting corresponding to the range where the voltage $V_{RECT}$ output from the rectification circuit 220 belongs.

FIG. 13 exemplifies a plurality of threshold voltages and the voltage $V_{RECT}$ output from the rectification circuit 220, but is not limited thereto. For example, in FIG. 2, the controller 280 may set a plurality of threshold values to be compared with the current output from the rectification circuit 220, the voltage standing wave ratio of the wireless power transmitter 102, or the phase of the impedance of the resonance circuit of the wireless power transmitter 102 in the same or similar manner as the method for setting a plurality of threshold voltages to be compared with the output voltage $V_{RECT}$ of the rectification circuit 220 described in connection with FIG. 13.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a battery;
a resonance circuit configured to wirelessly receive power from a wireless power transmitter, the resonance circuit comprising a reception coil, a first capacitor connected in series with the reception coil, a second capacitor and a second switch connected in parallel with the reception coil, and a first switch connected in parallel with the first capacitor, the second switch being connected in series with the second capacitor, wherein a first terminal of the second switch is connected to a first terminal of the second capacitor, a second terminal of the second switch is connected to a first terminal of the reception coil, and a second terminal of the second capacitor is connected to a second terminal of the reception coil;
a rectification circuit configured to rectify AC power provided from the resonance circuit to DC power;
a DC/DC converter configured to convert the DC power provided from the rectification circuit and output the converted DC power;
a charge control circuit configured to charge the battery with the converted power provided from the DC/DC converter; and
a controller,
wherein the controller is configured to:
identify a voltage output from the rectification circuit,
based on the voltage output from the rectification circuit, determine a distance between the electronic device and the wireless power transmitter configured to wirelessly transmit power to the electronic device,
based on the distance being less than a designated distance, control the first switch and the second switch to allow the reception coil and the first capacitor to configure a series resonance circuit in which the reception coil is electrically connected in series with the first capacitor and a current does not flow from the reception coil to the second capacitor, wherein the first switch and the second switch are opened, and
based on the distance being the designated distance or more, control the first switch and the second switch to allow the reception coil and the second capacitor to configure a parallel resonance circuit in which the reception coil is electrically connected in parallel with a circuit in which the second capacitor and the second switch are connected in series and a current does not flow from the reception coil to the first capacitor, wherein the first switch and the second switch are closed,
wherein a capacitance of the first capacitor is equal to a capacitance of the second capacitor such that a resonant frequency of the series resonance circuit is equal to a resonant frequency of the parallel resonance circuit.

2. The electronic device of claim 1, further comprising a communication circuit,
wherein the controller is configured to:
receive, from the wireless power transmitter, information about first power transmitted from the wireless power transmitter, through the communication circuit, and
set and/or adjust the threshold voltage to correspond to the first power based on the received information about the first power.

3. The electronic device of claim 1, wherein the controller is configured to:
identify whether the voltage output from the rectification circuit is a designated voltage or more,
based on the voltage output from the rectification circuit being the designated voltage or more, identify a current flowing to an over-voltage protection circuit of the electronic device,
based on the identified current being a threshold current or more, control the first switch and the second switch to allow the reception coil and the first capacitor to configure the series resonance circuit, and
based on the identified current being less than the threshold current, control the first switch and the second switch to allow the reception coil and the second capacitor to configure the parallel resonance circuit.

4. The electronic device of claim 1, further comprising a communication circuit,
wherein the controller is configured to:
receive, from the wireless power transmitter, information about a voltage standing wave ratio of the wireless power transmitter, through the communication circuit,
based on the identified voltage standing wave ratio being a threshold voltage standing wave ratio or more, control the first switch and the second switch to allow the reception coil and the first capacitor to configure the series resonance circuit, and
based on the identified voltage standing wave ratio being less than the threshold voltage standing wave ratio, control the first switch and the second switch to allow the reception coil and the second capacitor to configure the parallel resonance circuit.

5. The electronic device of claim 1, further comprising a communication circuit,
wherein the controller is configured to:
receive, from the wireless power transmitter, information about a phase of impedance of a resonance circuit of the wireless power transmitter, through the communication circuit,
based on the identified phase being less than a threshold phase, control the first switch and the second switch to allow the reception coil and the first capacitor to configure the series resonance circuit, and
based on the identified phase being the threshold phase or more, control the first switch and the second switch to allow the reception coil and the second capacitor to configure the parallel resonance circuit.

6. The electronic device of claim 1, wherein the controller is further configured to control the first switch and the second switch based on at least one of a current flowing to an over-voltage protection circuit of the electronic device, a voltage standing wave ratio of the wireless power transmitter, or a phase of impedance of a resonance circuit of the wireless power transmitter.

7. The electronic device of claim 1, wherein the controller is further configured to:
based on the power being not received from the wireless power transmitter, maintain the reception coil and the first capacitor in the series resonance circuit.

8. A method for wirelessly receiving power by an electronic device, the method comprising:
identifying a voltage output from a rectification circuit of the electronic device;
based on the voltage output from the rectification circuit, determining a distance between the electronic device and a wireless power transmitter configured to wirelessly transmit power to the electronic device;

based on the distance being less than a designated distance, controlling a first switch and a second switch included in a resonance circuit of the electronic device to allow a reception coil and a first capacitor included in the resonance circuit to configure a series resonance circuit in which the reception coil is electrically connected in series with the first capacitor and a current does not flow from the reception coil to a second capacitor, wherein the first switch and the second switch are opened, the resonance circuit comprising the reception coil, the first capacitor connected in series with the reception coil, the second capacitor and the second switch connected in parallel with the reception coil, and the first switch connected in parallel with the first capacitor, the second switch being connected in series with the second capacitor, the resonance circuit being configured to wirelessly receive power from a wireless power transmitter, wherein a first terminal of the second switch is connected to a first terminal of the second switch, a second terminal of the second switch is connected to a first terminal of the reception coil, and a second terminal of the second capacitor is connected to a second terminal of the reception coil; and based on the distance being the designated distance or more, controlling the first switch and the second switch to allow the reception coil and the second capacitor to configure a parallel resonance circuit in which the reception coil is electrically connected in parallel with a circuit in which the second capacitor and the second switch are connected in series and a current does not flow from the reception coil to the first capacitor, wherein the first switch and the second switch are closed, wherein a capacitance of the first capacitor is equal to a capacitance of the second capacitor such that a resonant frequency of the series resonance circuit is equal to a resonant frequency of the parallel resonance circuit.

9. The method of claim 8, further comprising:
receiving, from the wireless power transmitter, information about first power transmitted from the wireless power transmitter, through a communication circuit of the electronic device; and
setting and/or adjusting the threshold voltage to correspond to the first power based on the received information about the first power.

10. The method of claim 8, further comprising:
identifying whether the voltage output from the rectification circuit is a designated voltage or more;
when the voltage output from the rectification circuit is the designated voltage or more, identifying a current flowing to an over-voltage protection circuit of the electronic device;
based on the identified current being a threshold current or more, controlling the first switch and the second switch to allow the reception coil and the first capacitor to configure the series resonance circuit; and
based on the identified current being less than the threshold current, controlling the first switch and the second switch to allow the reception coil and the second capacitor to configure the parallel resonance circuit.

11. The method of claim 8, further comprising:
receiving, from the wireless power transmitter, information about a voltage standing wave ratio of the wireless power transmitter;
based on the identified voltage standing wave ratio being a threshold voltage standing wave ratio or more, controlling the first switch and the second switch to allow the reception coil and the first capacitor to configure the series resonance circuit; and
based on the identified voltage standing wave ratio being less than the threshold voltage standing wave ratio, controlling the first switch and the second switch to allow the reception coil and the second capacitor to configure the parallel resonance circuit.

12. The method of claim 8, further comprising:
receiving, from the wireless power transmitter, information about a phase of impedance of a resonance circuit of the wireless power transmitter;
if the identified phase is less than a threshold phase, controlling the first switch and the second switch to allow the reception coil and the first capacitor to configure the series resonance circuit; and
if the identified phase is the threshold phase or more, controlling the first switch and the second switch to allow the reception coil and the second capacitor to configure the parallel resonance circuit.

13. The method of claim 8, further comprising controlling the first switch and the second switch based on at least one of a current flowing to an over-voltage protection circuit of the electronic device, a voltage standing wave ratio of the wireless power transmitter, or a phase of impedance of a resonance circuit of the wireless power transmitter.

14. The method of claim 8, wherein, based on the power being not received from the wireless power transmitter, the reception coil and the first capacitor is maintained in the series resonance circuit.

* * * * *